(12) United States Patent
Ali et al.

(10) Patent No.: US 11,728,849 B2
(45) Date of Patent: Aug. 15, 2023

(54) METHOD AND APPARATUS FOR MULTI-OBJECTIVE BEAM MANAGEMENT

(71) Applicant: Samsung Electronics Co., Ltd., Suwon-si (KR)

(72) Inventors: Anum Ali, Plano, TX (US); Jianhua Mo, Allen, TX (US); Boon Loong Ng, Plano, TX (US); Vutha Va, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/519,456

(22) Filed: Nov. 4, 2021

(65) Prior Publication Data

US 2022/0166465 A1 May 26, 2022

Related U.S. Application Data

(60) Provisional application No. 63/118,432, filed on Nov. 25, 2020.

(51) Int. Cl.
*H04B 7/02* (2018.01)
*H04B 7/0404* (2017.01)

(52) U.S. Cl.
CPC ................... *H04B 7/0404* (2013.01)

(58) Field of Classification Search
CPC .................................................... H04B 7/0404
USPC ........ 375/267, 261, 260, 259, 219, 295, 316
See application file for complete search history.

(56) References Cited

U.S. PATENT DOCUMENTS

| | | |
|---|---|---|
| 10,567,058 B2 | 2/2020 | Guo et al. |
| 10,582,503 B2 | 3/2020 | Li et al. |
| 10,715,241 B2 | 7/2020 | Islam et al. |
| 10,931,361 B2 | 2/2021 | Park et al. |
| 2006/0270360 A1 | 11/2006 | Han et al. |
| 2015/0312958 A1 | 10/2015 | Cheng et al. |
| 2019/0132033 A1 | 5/2019 | Akkarakaran et al. |
| 2019/0173533 A1 | 6/2019 | Kim et al. |
| 2019/0222275 A1 | 7/2019 | Mo et al. |
| 2019/0394664 A1* | 12/2019 | Sun ...................... H04B 7/0695 |
| 2020/0145080 A1* | 5/2020 | Tang .................. H04W 52/0235 |
| 2020/0163073 A1 | 5/2020 | Li et al. |

(Continued)

FOREIGN PATENT DOCUMENTS

| | | |
|---|---|---|
| JP | 2011-254524 A | 12/2011 |
| KR | 10-2018-0016301 A | 2/2018 |

(Continued)

OTHER PUBLICATIONS

International Search Report and Written Opinion dated Feb. 23, 2022 regarding International Application Mo. PCT/KR2021/017569, 8 pages.

*Primary Examiner* — Zewdu A Kassa

(57) ABSTRACT

An electronic device and methods for performing beam management in the electronic device are disclosed herein. An electronic device performing beam management comprises a plurality of antenna modules and a processor. The processor is configured to determine at least two objectives for beam management of the plurality of antenna modules, select at least one parameter for the beam management based on the determined at least two objectives, and perform the beam management on the plurality of antenna modules based on the selected at least one parameter.

20 Claims, 16 Drawing Sheets

(56) References Cited

U.S. PATENT DOCUMENTS

| | | | |
|---|---|---|---|
| 2020/0205012 A1 | 6/2020 | Bengtsson et al. |
| 2020/0228180 A1 | 7/2020 | Zhang et al. |
| 2020/0314934 A1 | 10/2020 | Raghavan et al. |
| 2020/0328785 A1 | 10/2020 | Lee et al. |
| 2020/0382194 A1 | 12/2020 | Park et al. |
| 2021/0013954 A1 | 1/2021 | Zhao et al. |

FOREIGN PATENT DOCUMENTS

| | | |
|---|---|---|
| KR | 10-2020-0050883 A | 5/2020 |
| KR | 10-2020-0104854 A | 9/2020 |
| WO | 2018175002 A1 | 9/2018 |
| WO | 2019242027 A1 | 12/2019 |

\* cited by examiner

METHOD AND APPARATUS FOR MULTI-OBJECTIVE BEAM MANAGEMENT

CROSS-REFERENCE TO RELATED APPLICATION(S) AND CLAIM OF PRIORITY

This application claims priority under 35 U.S.C. § 119(e) to U.S. Provisional Patent Application No. 63/118,432 filed on Nov. 25, 2020, which is hereby incorporated by reference in its entirety.

TECHNICAL FIELD

This disclosure relates generally to beam management in wireless communications systems. Embodiments of this disclosure relate to methods and apparatuses for performing beam management while considering multiple criteria in a wireless communications system.

BACKGROUND

Wireless communication has been one of the most successful innovations in modern history. Recently, the number of subscribers to wireless communication services exceeded five billion and continues to grow quickly. The demand for wireless data traffic is rapidly increasing due to the growing popularity among consumers and businesses of smart phones and other mobile data devices such as tablets, "note pad" computers, net books, eBook readers, and machine type of devices. In order to meet the high growth in mobile data traffic demand and support new applications and deployments, improvements in radio interface efficiency and coverage are of paramount importance.

SUMMARY

Embodiments of the present disclosure provide a method and an apparatus for beam management.

In one embodiment, an electronic device is provided, comprising a plurality of antenna modules and a processor. The processor is configured to determine at least two objectives for beam management of the plurality of antenna modules, select at least one parameter for the beam management based on the determined at least two objectives, and perform the beam management on the plurality of antenna modules based on the selected at least one parameter.

In another embodiment, a method of beam management is provided, including the steps of determining at least two objectives for beam management of a plurality of antenna modules, selecting at least one parameter for the beam management based on the determined at least two objectives, and performing the beam management on the plurality of antenna modules based on the selected at least one parameter.

In another embodiment, a non-transitory computer-readable medium is provided. The non-transitory computer-readable medium is configured to store instructions that, when executed by a processor, cause the processor to determine at least two objectives for beam management of the plurality of antenna modules, select at least one parameter for the beam management based on the determined at least two objectives, and perform the beam management on the plurality of antenna modules based on the selected at least one parameter.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
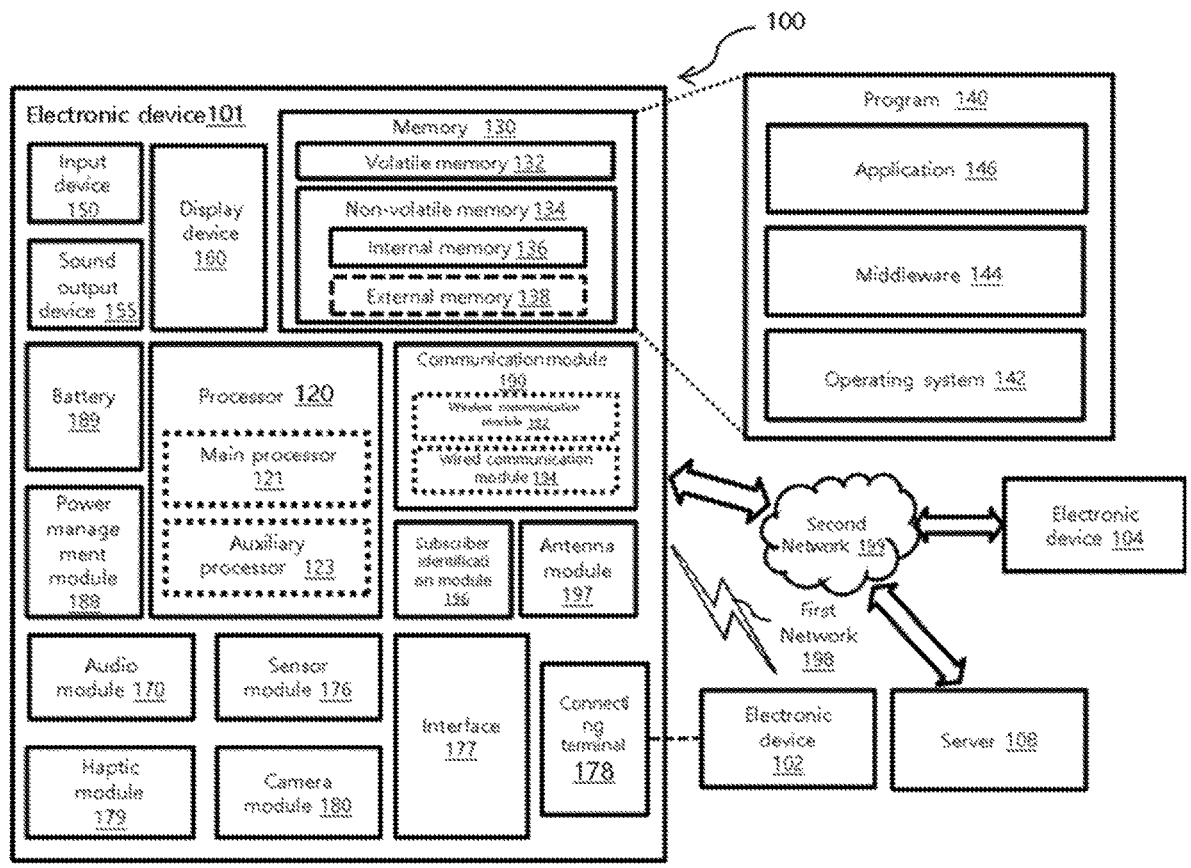
FIG. 1 illustrates an example electronic device in a network environment according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented to include higher frequency (mmWave) bands, such as 28 GHz or 60 GHz bands or, in general, above 6 GHz bands, so as to accomplish higher data rates or, in lower frequency bands, such as below 6 GHz, to enable robust coverage and mobility support. A 5G terminal or user equipment (UE) can be equipped with multiple antenna elements. There can also be one or more antenna modules fitted on the terminal, where each module can include one or more antenna elements. Beamforming is an important factor when a UE tries to establish a connection with a base station (BS). To compensate for the narrower analog beamwidth in mmWave, analog beam sweeping can be employed to enable wider signal reception or transmission coverage for the UE.

The present disclosure relates generally to 5G wireless communication systems. Aspects of the present disclosure may also be applied to deployment of 5G communication system, 6G or even later release which may use terahertz (THz) bands. A communication system includes a downlink (DL) that conveys signals from transmission points such as base stations (BSs), eNodeBs (eNBs), or gNodeBs (gNBs) to user equipments (UEs) and an uplink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology. To decrease propagation loss of the radio waves and increase the transmission distance, beamforming, massive multiple-input multiple-output (MIMO), full dimensional MIMO (FD-MIMO), array antenna, and analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

Depending on the network type, the term "base station" or "BS" can refer to any component (or collection of components) configured to provide wireless access to a network, such as transmit point (TP), transmit-receive point (TRP), an enhanced base station (eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this disclosure to refer to remote wireless equipment that wirelessly accesses a BS, whether the UE is a mobile device (such as a mobile telephone or smartphone) or is normally considered a stationary device (such as a desktop computer or vending machine).

Embodiments of the present disclosure recognize that beamforming is an important factor when a UE tries to establish a connection with a BS in mmWave systems. To compensate for the narrower analog beamwidth in mmWave, analog beam sweeping can be employed to enable wider signal reception or transmission coverage for the UE. A beam codebook comprises a set of codewords, where a codeword is a set of analog phase shift values, or a set of amplitude plus phase shift values, applied to the antenna elements within an antenna module (or panel), in order to form an analog beam.

Embodiments of the present disclosure further recognize that beam management (BM) in a multi-module device (i.e., a device including multiple antenna modules) provides some unique challenges. Beam management generally refers to the procedure of finding a suitable beam (or multiple beams) at the UE and BS to maintain communication. The procedure typically requires finding a suitable set of parameters that ensure successful beam management. For multi-module devices, and in an operation where one serving antenna module is active at a time, an example time parameter for beam management determines how often to search for beams on the non-serving (or inactive) modules (often referred to as the module sweeping rate). Another example time parameter for beam management determines how often the serving module changes (often referred to as the module switching rate). As yet another example parameter, a signal quality metric threshold parameter for beam management can determine when a signal quality has fallen so low that a beam search over all antenna modules is required. The present disclosure considers reference signal received power (RSRP) to be the signal quality metric, but other metrics, such as signal-to-interference-and-noise ratio (SINR) or signal-to-noise ratio (SNR), or reference signal received quality (RSRQ), may be used.

Embodiments of the present disclosure further recognize that, typically, the parameters for beam management are optimized according to one given criterion. As an example, if maximizing the throughput of the selected beam is the criterion, a set of beam management parameters is selected that maximizes throughput. Similarly, another criterion can be maximizing the signal quality metric (e.g., RSRP) of the selected beam. Other criteria include minimizing a module sweeping rate (i.e., how often non-serving modules are swept to find the best beam) and minimizing a module switching rate (i.e., how often the serving module changes). It is typically straightforward to select beam management parameters optimized for one of the aforementioned criteria, e.g., maximizing throughput, maximizing RSRP, minimizing module sweeping rate, or minimizing module switching rate.

Embodiments of the present disclosure recognize, however, that optimizing multiple criteria at one time poses a conflict of interests. For example, it may be possible to increase the throughput of the selected beam, but at the cost of increased power consumption and increased module sweeping and module switching rates. Similarly, it may be possible to reduce the module sweeping and switching rates at the cost of reduced throughput of the selected beam. Achieving an acceptable compromise among multiple beam management objectives (or criteria) is generally difficult.

The cost of module sweeping may include increased power consumption, latency due to RF activation ramp-up time, and so on. The extent of cost generally depends on implementation.

Accordingly, embodiments of the present disclosure provide methods and apparatuses that dynamically optimize beam management parameters according to multiple criteria. The disclosure includes strategies to determine two or more objectives for beam management of the multiple antenna modules 197, and strategies to select a set of parameters for the beam management based on the two or more objectives. The disclosed strategies ensure that there are reliable high throughput links with minimum beam management related operational cost (i.e., module sweeping/switching etc.) at the UE or the BS.

FIG. 1 illustrates an example electronic device 101 in a network environment 100 according to various embodiments of the present disclosure. In this embodiment, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components (e.g., the display device 160 or the camera module 180) may be omitted from the electronic device 101, or one or more other components may be added in the electronic device 101. In some embodiments, some of the components may be implemented as a single integrated circuit. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101 instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data from the outside (e.g., from a user) of the electronic device 101, to be used by another component (e.g., the processor 120) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for incoming calls. According to an embodiment, the receiver may be implemented separate from or as part of the speaker.

The display device 160 may visually provide information to the outside (e.g., to a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force induced by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or a luminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, WI-FI DIRECT, Ultra-WideBand (UWB), or INFRARED DATA ASSOCIATION (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside of the electronic device 101 (e.g., to or from an external electronic device). According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to an embodiment, the electronic device 101 may include multiple antenna modules 197. Each antenna module 197 can have multiple antennas, referred to as antenna elements, configured such that the antenna module 197 is capable of beamforming using the multiple antenna elements.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. In various embodiments, the electronic device 101 may be a 5G UE or a 5G BS. It is understood that the electronic devices are not limited to those described above.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., GOOGLE PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
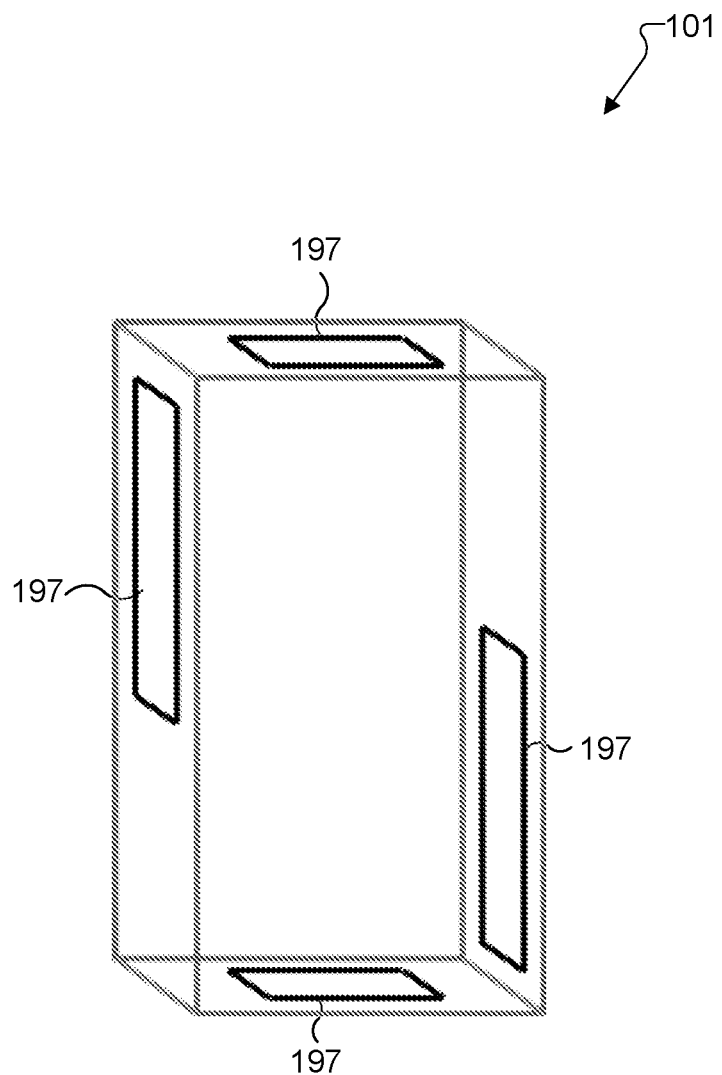
FIG. 2 illustrates an example electronic device according to embodiments of the present disclosure.

FIG. 2 illustrates an example electronic device 101 according to embodiments of the present disclosure. For the purposes of this disclosure, the electronic device 101 will be discussed as a UE, but it is understood that it could be any suitable wireless communication device. The electronic device 101 is a multi-module device, including multiple antenna modules 197. In this example, the electronic device 101 includes 4 antenna modules 197, but it is understood that more or less antenna modules 197 could be included.

The inclusion of multiple antenna modules 197 allows for robustness against blockage and better spherical coverage as compared to the use of a single antenna module 197. Blockage can refer to blockage of an antenna module's radiation or reception of radiation by, for example, a part of a user's body (e.g., a hand), by another object in the external environment, or by another part of the electronic device 101 itself (e.g., due to the device being in a folded or partially folded state). FIG. 2 shows one example of antenna module 197 placement on a multi-module device.

Figure 3:
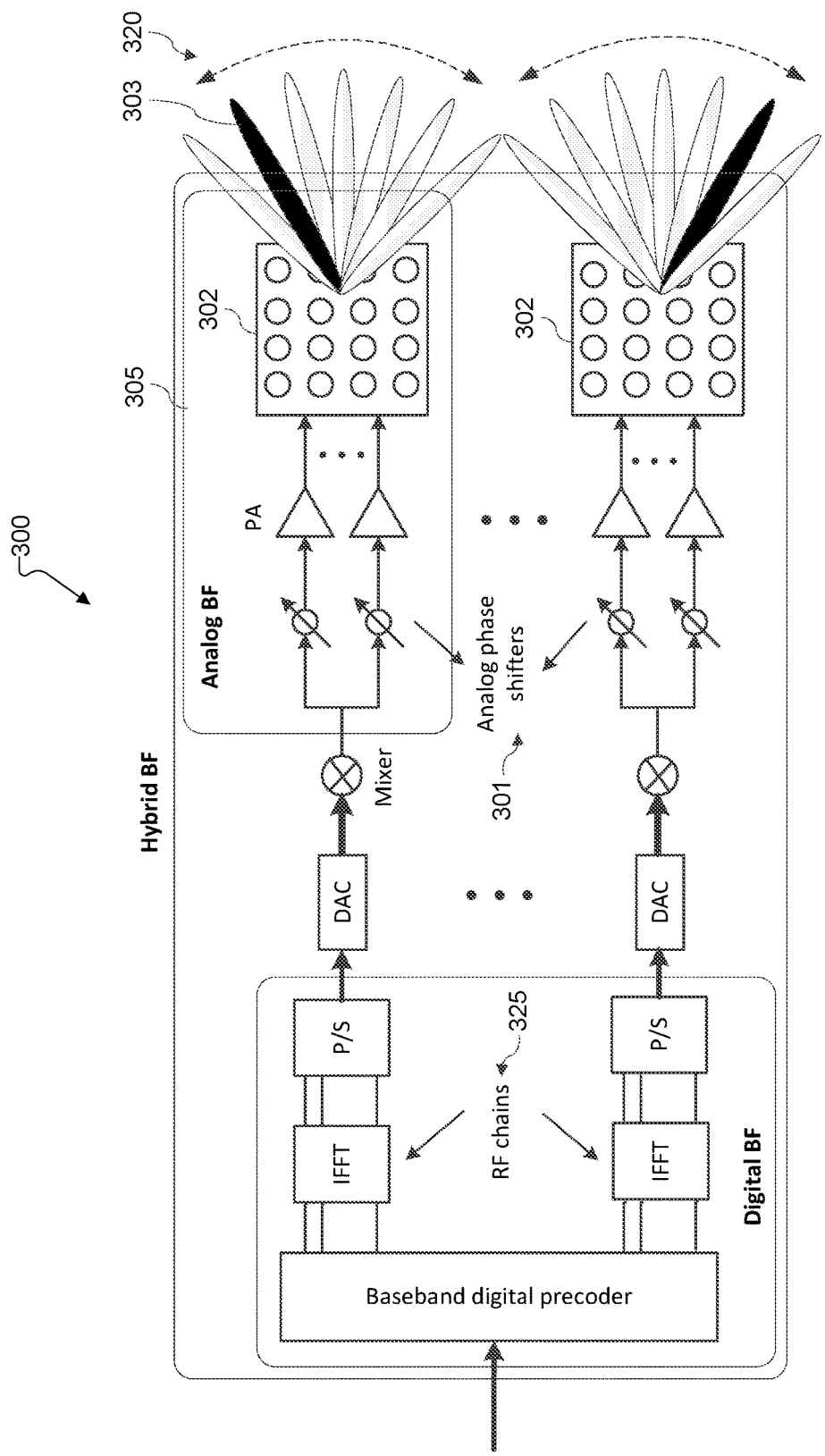
FIG. 3 illustrates a block diagram of example hybrid beamforming (BF) hardware 300 according to embodiments of the present disclosure.

FIG. 3 illustrates a block diagram of example hybrid beamforming (BF) hardware 300 according to embodiments of the present disclosure. The hybrid BF hardware 300 is implemented in the electronic device 101 of FIG. 1. For the purposes of this disclosure, embodiments will be discussed wherein the electronic device 101 is a UE and wherein the electronic device 101 is a BS. However, it is understood that any other beamforming-capable wireless communication device could include hybrid BF hardware 300.

For mmWave band devices, although the number of antenna elements can be large for a given form factor, the number of digitally precoded ports—which can correspond to the number of digital RF chains 325—tends to be limited due to hardware constraints (such as the feasibility of installing a large number of ADCs or DACs at mmWave frequencies) as illustrated in FIG. 3.

In this case, one digital RF chain 325 is mapped onto a large number of antenna elements which can be controlled by a bank of analog phase shifters 301. One digital RF chain 325 can then correspond to one antenna sub-array 302 (which could correspond to an antenna module 197) which produces a narrow analog beam 303 through analog beamforming 305. This analog beam 303 can be configured to sweep across a wide range of angles 320 by varying the phase shifter bank 301 across a transmission time interval.

A BS could utilize one or multiple transmit beams to cover the whole area of one cell. The BS may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for BS to provide coverage with a single transmit beam, i.e., to ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the BS may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the BS may form receive beams.

To assist the UE in determining its receive and/or TX beam, a beam sweeping procedure is employed consisting of the BS transmitting a set of transmit beams to sweep the cell area and the UE measuring the signal quality on different beams using its receive beams. To facilitate candidate beam identification, beam measurement and beam quality reporting, the BS configures the UE with one or more reference signal (RS) resources (e.g., SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI). Based on the UE's measurement report feedback, the BS configures the UE with one or more Transmission Configuration Indicator (TCI) states for reception of PDCCH and/or PDSCH.

Although FIG. 3 illustrates one example of hybrid BF hardware 300, various changes may be made to FIG. 3. For example, various components in FIG. 3 could be combined, further subdivided, or omitted and additional components could be added according to particular needs.

Figure 4:
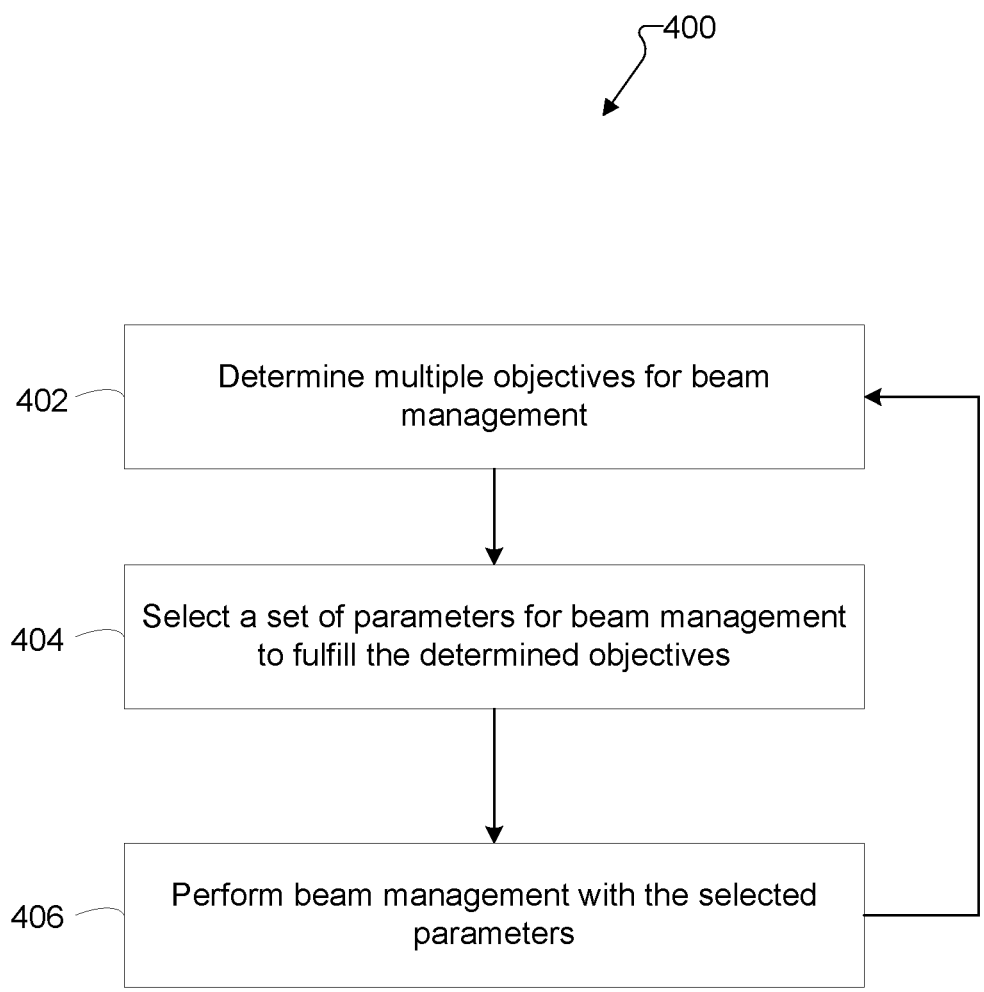
FIG. 4 illustrates an overall process for beam management with multiple objectives in an electronic device according to embodiments of the present disclosure.

FIG. 4 illustrates an overall process 400 for beam management with multiple objectives in an electronic device 101 according to embodiments of the present disclosure. For the purposes of this disclosure the electronic device 101 will be discussed as a UE, but it is understood that it could be any suitable wireless communication device.

First, at operation 402, it is determined which performance metrics or objective (e.g., throughput, RSRP, module sweeping rate, and module switching rate) are of interest for the beam management operation. As an example, it may be desirable to have a reasonable throughput while minimizing the module sweeping rate. Although the cost of module sweeping rate, in terms of throughput loss and power consumption, may be fixed, the tolerance for this cost can vary with time.

The variation of tolerance can be based on the desired data rate of the electronic device 101 (e.g., a data rate demanded by a user's activities, such as running one or more applications that involve data transfer). The desired data rate can vary between a low data rate requirement and a high data rate requirement. Low data rate could be for, e.g., checking emails (without attachments) which could require a data rate only on the order of hundreds of kilobits per second (kbps). High data rate could be for, e.g., streaming high quality videos or gaming, which could require a data rate on the order of tens of megabytes per second (mbps). In one embodiment, if the user is not demanding a high data rate then the objective should be to trade throughput for a lower sweeping rate in order to save power. Similarly, if the user is demanding a high data rate then power can be traded for throughput. Data rate can also be referred to as throughput, and accordingly the desired data rate can be referred to as a desired throughput.

Accordingly, input from higher layers can be used to determine which objectives are suitable for beam management in operation 402. Higher layers herein refers to the layers of the Open Systems Interconnection (OSI) model above the physical (PHY) layer. Specifically, the higher layers could abstract the current data rate demand into multiple levels and indicate the current demand level to the PHY layer. In one embodiment, there could be three levels of data rate demand: low, moderate, and high. This information can then be conveyed to the lower layers as each layer talks to the layer below itself. As the purpose of this information is the determination of the objective of beam management, which is expected to change relatively infrequently, updated data rate demand information may be conveyed somewhere between the order of hundreds of milliseconds to a few seconds.

Additionally, side information from onboard sensors of the electronic device 101 can also impact the objective, e.g., whether throughput is optimized with at the cost of higher module sweeping rate or vice versa. For example, when side information indicates a high battery level or low device temperatures, the cost of module sweeping in terms of power consumption may be more tolerable, so throughput can be maximized at the expense of a higher sweeping rate. Whereas, if the battery level is low or device temperatures are high, the primary focus may be minimizing the sweeping rate.

In some instances, operation 402 can be performed periodically (e.g., every 1 second) to dynamically track changes in the channel state (e.g., data rate requirement) or the device state (e.g., based on onboard sensors) so that objectives are dynamically selected and changed with varying channel or device states.

After the desired objectives of the beam management are decided, a set of parameters is selected in operation 404 to meet those objectives. The selection of parameters that can achieve good compromise between multiple objectives requires good understanding of the cost of each objective, so that a good tradeoff can be achieved. This understanding helps in devising a strategy that can be used to find a set of parameters that will achieve the desired tradeoff. Various methods for selecting the parameters in consideration of multiple objectives will be described further below.

Beam management is then performed with the selected parameters in step 406.

For ease of explanation, this disclosure focuses primarily on the objectives of throughput and module sweeping rate, and thus on selection of parameters that compromise between the objectives of throughput and module sweeping rate, but it is understood that other objectives can be determined and the disclosed parameter selection methods can be adjusted to select parameters that compromise between other objectives.

In the methods discussed below, one beam management parameter of interest is designated $RSRP_{th0}$. This parameter is an RSRP threshold related to the module sweeping rate of a device. For example, when the RSRP of the serving module (e.g., the RSRP of the best beam of the serving module, or the RSRP of the boresight beam of the serving module, or the average RSRPs of the beams of the serving module) falls below $RSRP_{th0}$, the other modules are swept to find a module better suited for transmission/reception (i.e., a module sweeping operation is performed). However, when the RSRP of the serving module is higher than $RSRP_{th0}$, or $RSRP_{th0}$ plus a hysteresis threshold, then only the beams of the serving modules are swept to find a best beam. Accordingly, the higher $RSRP_{th0}$ is set, the more aggressively the device will perform module sweeping, which will likely result in a high module sweeping rate in poor channel conditions.

Although FIG. 4 illustrates one example of process 400 for beam management with multiple objectives, various changes may be made to FIG. 4. For example, various operations in FIG. 4 could be combined, further subdivided, or omitted and additional operations could be added according to particular needs. In particular, a number of the embodiments discussed herein below are modifications of the process 400.

Figure 5:
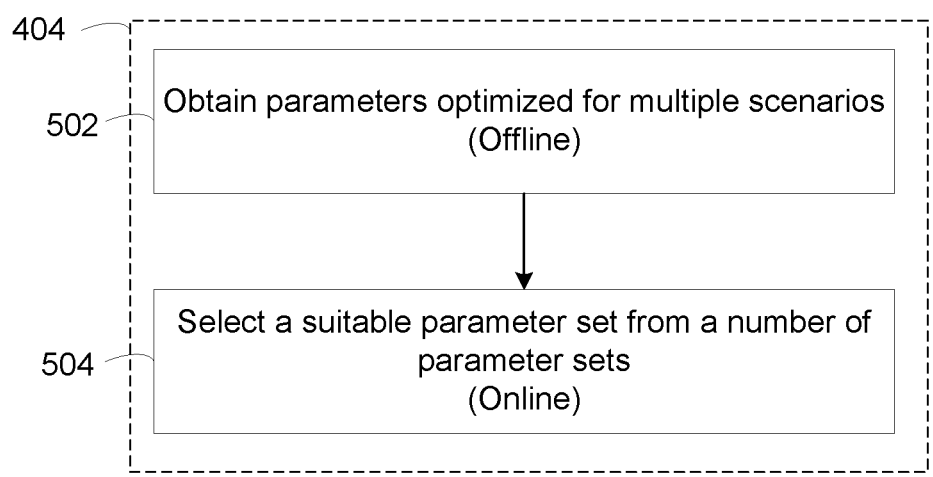
FIG. 5 illustrates a process for selecting a set of parameters for beam management that fulfill multiple objectives for beam management according to embodiments of the present disclosure.

FIG. 5 illustrates a process for selecting a set of parameters for beam management that fulfill multiple objectives for beam management according to embodiments of the present disclosure. For the purposes of this disclosure, the process of FIG. 5 represents operations of an electronic device 101, which is discussed as a UE. It is understood that the operations could apply to any suitable wireless communication devices in any suitable wireless communication system. Additionally, the process of FIG. 5 can represent operation 404 of FIG. 4.

In embodiments of FIG. 5, parameter selection for a given set of multiple objectives for beam management (e.g., the parameter selection of operation 404 based on the objectives determined in operation 402 of FIG. 4) is a two-step process. The two-step process includes an offline step of obtaining optimal parameters for multiple scenarios (in operation 502) and an online step of parameter selection (in operation 504).

In various embodiments that will be discussed herein below, the online parameter selection in operation 504 involves selecting one set of parameters from a number of parameter sets that have been optimized in advance for varying UE conditions (in operation 502). That is, operation 502 can be performed before runtime of the UE, e.g., before operation 402 of FIG. 4. UE conditions can include, e.g., whether channels are line of sight (LOS) or non-LOS (NLOS), whether the device is a cell-edge or cell-enter user, battery level of the device, temperatures of the device, and inputs from higher layers.

In embodiments of operation 502, the offline step of obtaining optimal parameter sets for different UE conditions can be performed in advance using a simulator that simulates different UE conditions (e.g., based on ray-tracing of the channels with practical mobility and rotation patterns) and generates a candidate set of optimal parameters. At the end of the offline step of operation 502, an optimal parameter set for each set of UE conditions has been generated. In such embodiments the offline step involves a detailed simulation, and hence can take a substantial amount of time to complete, e.g., on the order of several minutes. This offline task, however, does not cause any online latency or overhead since it is performed in advance of online operation of the electronic device 101. Furthermore, this operation can be performed by the electronic device 101, or by a different device that simulates the properties of the electronic device 101.

In operation 504, during online operation of the electronic device 101, a suitable parameter set is selected from the number of parameter sets optimized for different UE conditions in operation 502. For example, a lookup table (LUT) containing an optimal parameter sets mapped to each possible variation of UE conditions could be generated in operation 502, and then consulted in operation 504 to select the optimal parameter set that maps to current UE conditions. Various embodiments of offline parameter selection will be described further below.

Although FIG. 5 illustrates one example of a process for selecting a set of parameters for beam management that fulfill multiple objectives for beam management, various changes may be made to FIG. 5. For example, various operations in FIG. 5 could be combined, further subdivided, or omitted and additional operations could be added according to particular needs. As a specific example, operation 502 could be performed using measurement data collected by the device under different UE conditions rather than simulation data.

Figure 6:
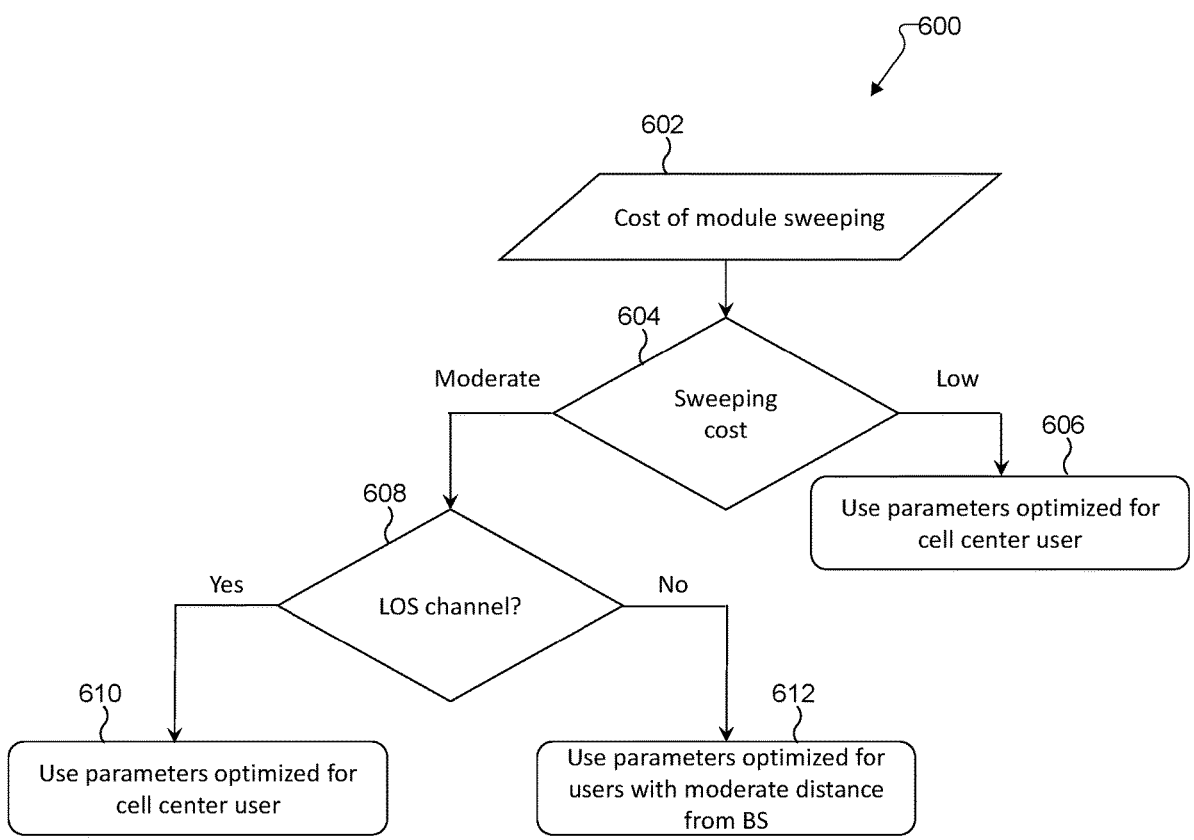
FIG. 6 illustrates a process for selecting a set of parameters for beam management according to embodiments of the present disclosure in which module sweeping cost is moderate or low.

FIG. 6 illustrates a process 600 for selecting a set of parameters for beam management according to embodiments of the present disclosure in which module sweeping cost is moderate or low. Process 600 selects parameters that achieve a compromise between the objectives of throughput and module sweeping rate. For the purposes of this disclosure, the process of FIG. 6 represents operations of an electronic device 101, which is discussed as a UE. It is understood that the operations could apply to any suitable wireless communication devices in any suitable wireless communication system.

Cost in embodiments of process 600 can refer to an operational cost to the electronic device 101. For example, the cost could be the extra power consumed due to module sweeping. Low cost would mean that the device can perform module sweeping without incurring significant additional power consumption (compared to the power consumed during non-sweeping operation), whereas high cost would mean that significant additional power is consumed during module sweeping (compared to the power consumed during non-sweeping operation). In addition to power consumption, latency also increases linearly with the number of beams swept. For example, a UE sweeps one receive beam during one synchronization signal block (SSB) period (for instance, 20 ms), so the latency caused by module sweeping increases linearly as the number of beams to be swept increases. Accordingly, cost in this example could also refer to the extra latency caused by module sweeping.

Process 600 can be an embodiment of the online parameter selection operation 504 of FIG. 5. In the examples of process 600 discussed herein below, sets of optimal parameters have been determined ahead of time (e.g., at offline operation 502) for varying UE conditions that include location of the UE within a cell, under the assumption of high module sweeping cost. For example, the UE conditions can include "cell center" and "cell edge" conditions, as well as a range of conditions in between.

A cell center UE (or cell center user or device) is located near the center of a cell (i.e., near the BS) and thus has high average RSRP channels that can achieve high throughput to the BS. Optimal parameters for cell center UE conditions may provide close to optimal throughput and close to optimal module sweeping rates at the same time, even when the cost of module sweeping is high. For example, a cell center user is likely to select parameters that include a high $RSRP_{th0}$, which allows the UE to aggressively select a beam that provides near optimal throughput. In cell center channel conditions, this is still unlikely to result in a high module sweeping rate due to the strong channel.

By contrast, a cell edge UE (or cell edge user) is located near the edge of a cell and likely has low average RSRP channels. If these UEs were to operate with a high $RSRP_{th0}$, then the RSRP of the serving module could be below $RSRP_{th0}$ for a significant fraction of the time, which would result in high sweeping rates. In fact, it is possible that cell edge users with a high $RSRP_{th0}$ end up spending almost all the time in the module sweeping operation. As a result, when cell center parameters are selected for cell edge users (or generally non cell center users) the parameters can ensure close to optimal throughput for these users, but will incur high sweeping overhead. Therefore, under the assumption of high sweeping cost at operation 502, optimal parameters for cell edge UEs may be determined to include a low $RSRP_{th0}$. Similarly, optimal parameters for UEs that are a moderate distance from the cell center may be determined to include a moderate $RSRP_{th0}$.

In the example of process 600, the cost of module sweeping is device-specific, and can be determined by experiments that relate power consumption with module sweeping. The resulting device-specific cost of module sweeping 602 is available to the process 600. At operation 604, the process determines whether the sweeping cost is low or moderate. In some embodiments, the process may determine at operation 604 that the sweeping cost is high, in which case the device may use a different strategy (i.e., other than process 600) to determine the parameters for beam management.

If the sweeping cost is determined to be low at operation 604, then a higher sweeping rate is tolerable. Therefore, beam management parameters may be selected primarily to achieve a high throughput when sweeping cost is low. Such parameters are similar to the optimal parameters for a cell center user or device. Accordingly, at operation 606 beam management parameters that correspond to cell center UE conditions are selected, regardless of whether the device is a cell center or cell edge user. This results in close to optimal throughput, and whether or not the sweeping rate is high as a result, the cost will be tolerable.

When the sweeping cost is determined to be moderate at operation 604, then a default set of parameters could be used, which are based on the optimal parameters for a cell center user. The default parameters, however, may be switched to a different set of parameters to reduce the sweeping rate whenever possible, such as when the device remains in a certain state for a prolonged period of time (on the order of several seconds) and there are parameters associated with that state that can give a reasonable throughput (e.g., higher than 90% of the optimal throughput) with a reduced sweeping rate. These parameters can be determined based on side information, such as whether the channel is LOS or NLOS.

At operation 608, the process determines whether the channel is LOS or NLOS. The LOS/NLOS state can be detected based on the spread of the power across beams. If multiple beams have comparable power then it is likely that the channel is NLOS, as LOS channels typically have one strong path, resulting in one or a small number of beams with a large power. If the channel is determined to be LOS, then the default parameters (i.e., the optimal parameters for a cell center user) are used at operation 610.

NLOS channels are typically much weaker than LOS channels, therefore, if the channel is determined to be NLOS at operation 608 then optimal parameters for a user that is a moderate distance from cell center are selected at operation 612. In some embodiments, optimal conditions for a cell edge user may be selected instead. For example, a lower $RSRP_{th0}$ is selected, and the sweeping rate should be reduced as a result.

In some embodiments, the decision whether to stay with the default parameters or select different parameters optimized for a certain scenario may also impacted by trust in the side information. For example, if the channel happens to be in a state where it is not entirely clear whether the channel is LOS or NLOS at operation 608, then the process may treat the channel as LOS and cell center user based parameters can be used (e.g., at operation 610) to err on the side of higher throughput. As discussed above, one method of determining LOS/NLOS channel state is based on the spread of the power across beams. This spread is calculated and compared against a user determined threshold. In some embodiments, it is determined not to be clear whether the channel is LOS/NLOS if the calculated value is relatively close to the threshold, e.g., within ±5%.

In another embodiment, instead of the LOS/NLOS channel state, operation 608 may consider the location of the electronic device 101 to determine which set of parameters to use. Location information may be obtained from GPS or from a cellular-based localization capability of the device. Based on the location of the device, the distance to the BS (i.e., cell center) can be computed to determine if the user is at the cell center or at the cell edge. If users are categorized into only two groups (i.e., cell center and cell edge) and the cell radius is R, then as an example, the users that are within 0.7R can be considered cell center users, whereas other users can be considered cell edge users. Then, for example, if the device is within 0.7R the process could use the default parameters of operation 610, otherwise the process could select the parameters optimal for cell edge users at operation 612.

Although FIG. 6 illustrates one example of a process for selecting a set of parameters for beam management, various changes may be made to FIG. 6. For example, various operations in FIG. 6 could be combined, further subdivided, or omitted and additional operations could be added according to particular needs.

Figure 7:
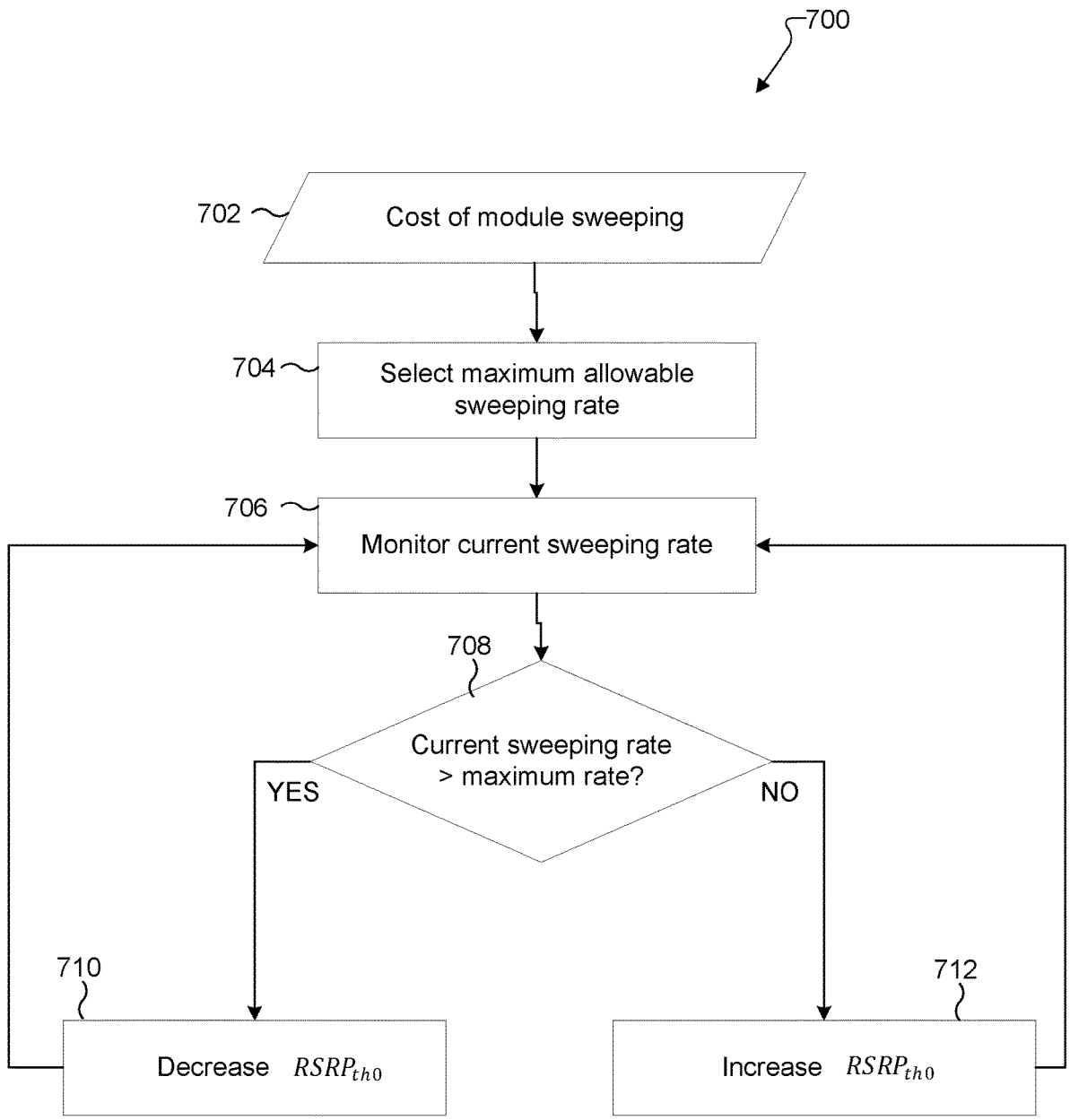
FIG. 7 illustrates a process for selecting a set of parameters for beam management with a focus on keeping sweeping rate in control according to embodiments of the present disclosure.

FIG. 7 illustrates a process 700 for selecting a set of parameters for beam management with a focus on keeping sweeping rate in control according to embodiments of the present disclosure. Process 700 selects parameters that achieve a compromise between the objectives of throughput and module sweeping rate. For the purposes of this disclosure, the process of FIG. 7 represents operations of an electronic device 101, which is discussed as a UE. It is understood that the operations could apply to any suitable wireless communication devices in any suitable wireless communication system.

In order to keep the sweeping rate in check, A UE can consistently monitor the sweeping rate and compare it against a pre-determined sweeping rate, e.g., a maximum allowable sweeping rate. The maximum allowable sweeping rate is a parameter that can be selected to prevent the sweeping rate from becoming too high. For example, a given UE has a maximum possible sweeping rate (i.e., a hardware-based upper bound on sweeping rate) that is based on the number of antenna modules 197 and the number of possible beams that can be formed (e.g., if the UE sweeps one receive beam during one SSB period (e.g., every 20 ms), and there are N beams (e.g., 14 beams) and M modules (e.g., 2 modules), then the upper bound on module sweeps per second is 7.14 module sweeps per second), but the maximum allowable sweeping rate can be set to be lower than the maximum possible sweeping rate.

The maximum allowable sweeping rate can reflect different costs of module sweeping. Accordingly, at operation 702, the cost of module sweeping can be provided to the process 700. For example, a device-specific cost of module sweeping may be determined as discussed above with respect to device-specific cost of module sweeping 602 of process 600.

At operation 704, a maximum allowable sweeping rate is selected. If the sweeping cost (e.g., in terms of throughput loss and power consumption) is low, the maximum allowable sweeping rate can be set to a large value (e.g., almost the same as the upper bound calculated earlier), whereas if it is high, the maximum allowable sweeping rate can be set to a lower value (e.g., 20-30% of the upper bound). In some embodiments, the maximum allowable sweeping rate can be a set parameter that is obtained by the process 700 at operation 704.

At operation 706, the current sweeping rate of the device is monitored. Module sweeping is performed at the UE itself, and as such it is easy for the UE to monitor the sweeping rate. For example, the UE can monitor the number of sweeps performed in the last s seconds, e.g., the last 1 second or 5 seconds.

The current sweeping rate is then compared to the maximum allowable sweeping rate at operation 708. If the sweeping rate exceeds the maximum allowable sweeping rate (which indicates that the RSRP of the serving module is consistently low), then the $RSRP_{th0}$ is decreased at operation 710 so as to reduce the sweeping rate. For example, whenever the sweeping rate exceeds the maximum allowable sweeping rate, $RSRP_{th0}$ is reduced by a set amount (e.g., by 5 dB). Iterating on this strategy (e.g., by returning to operation 706 and continuing to monitor the sweeping rate), eventually $RSRP_{th0}$ will reach a level such that the sweeping rate will be below the maximum allowable sweeping rate.

Similarly, if the sweeping rate is less than or equal to the maximum allowable sweeping rate (which indicates that the RSRP of the serving module is consistently high), then the $RSRP_{th0}$ can be iteratively increased (e.g., by 5 dB) at operation 712 to operate as close to the maximum allowable sweeping rate as possible without exceeding the maximum allowable sweeping rate.

This strategy consistently adjusts the sweeping rate such that it remains close to the maximum allowable sweeping rate, but does not in itself ensure the highest possible throughput in all cases. In order to ensure good throughput in a wide range of scenarios (e.g., for LOS and NLOS channels, cell-center and cell-edge conditions, etc.), the maximum allowable sweeping rate should be selected at operation 704 to be as high as is feasible.

Although FIG. 7 illustrates one example of process 700 for selecting a set of parameters for beam management, various changes may be made to FIG. 7. For example, various operations in FIG. 7 could be combined, further subdivided, or omitted and additional operations could be added according to particular needs. As a specific example, the strategy of process 700 can be adjusted to achieve a compromise between switching rate and throughput by changing the role of module sweeping rate with module switching rate in process 700.

Figure 8:
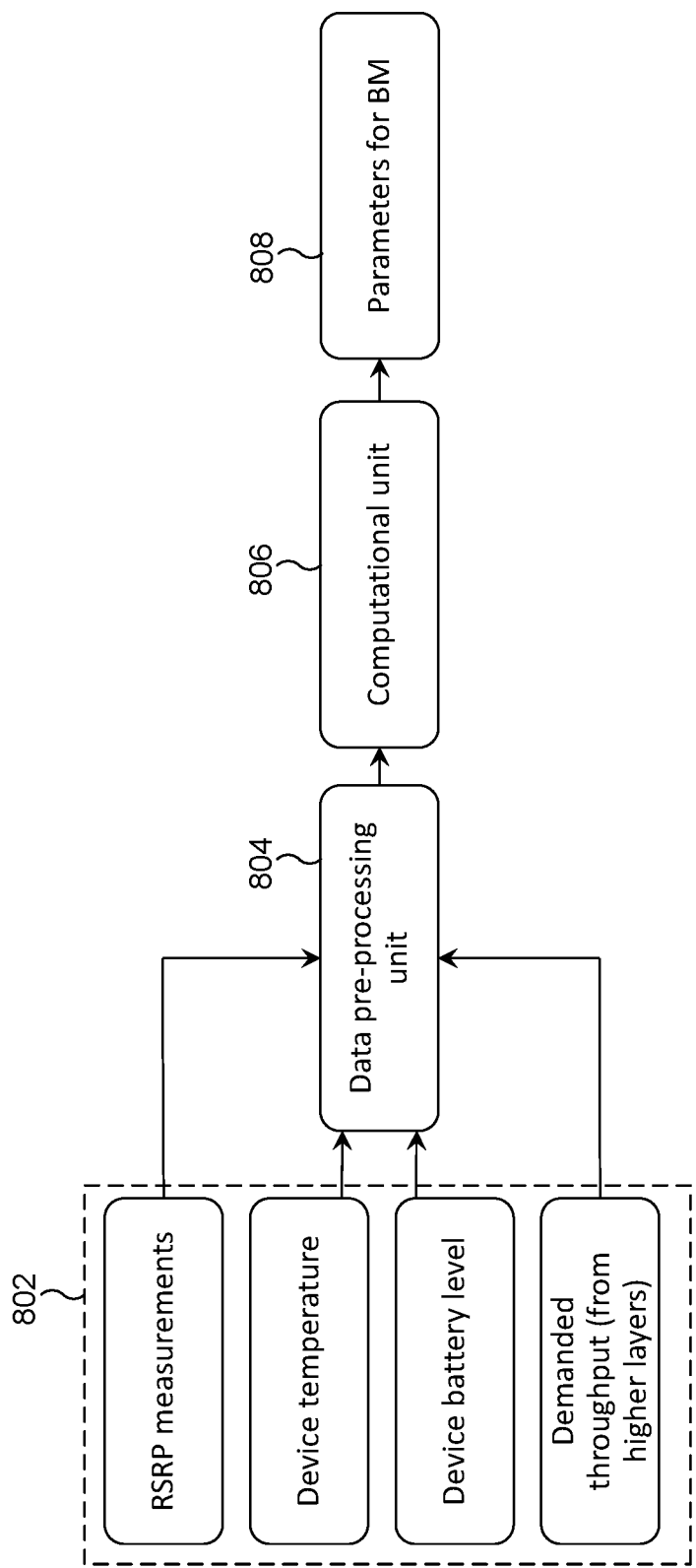
FIG. 8 illustrates a block diagram of an example data-driven approach for selecting a set of parameters for beam management according to embodiments of the present disclosure.

FIG. 8 illustrates a block diagram of an example data-driven approach for selecting a set of parameters for beam management according to embodiments of the present disclosure. The data-driven approach in this example uses a machine learning (ML) model that can predict the set of parameters based on measured data (e.g., UE conditions). For the purposes of this disclosure, the example model of FIG. 8 is implemented in an electronic device 101, which is discussed as a UE. It is understood that the disclosure could apply to any suitable wireless communication devices in any suitable wireless communication system.

The ML model of FIG. 8 represents a trained ML model. In some embodiments, the trained ML model is obtained by the device, while in other embodiments the device may train the ML model itself. In either case, the ML model is trained ahead of runtime, as will be discussed further below.

At runtime, the device collects measurement data for input to the trained ML model as a feature set 802. The features set 802 represents current conditions of the UE, and can be comprised of side information obtained from sensors of the device, channel measurement information, information obtained from higher layers about the device conditions, or the like. In this example, the feature set 802 comprises RSRP measurements, the current battery level and current temperature of the device (e.g., input from sensors of the device), and the demanded throughput (e.g., demanded data rate) received from higher layers. The RSRP measurement can be the highest measured RSRP from the last N measurements. Here, N is a design parameter. Smaller values of N (e.g., 1) only use the most recent channel information (more suitable for a highly dynamic environment), whereas larger values of N (e.g., 10-100) also use the prior channel information (more suitable for a less dynamic environment). This feature captures the strength of the channel, and alternative features that capture received signal strength such as SINR, SNR, or RSRQ can also be used.

The feature set 802 is then input to the data pre-processing unit 804, which creates a feature vector based on the input feature set 802. The feature vector is input to the computational unit 806. The computational unit 806 predicts a set of parameters 808 (e.g., $RSRP_{th0}$), based on the trained ML model and the input feature vector, as optimal parameters for beam management under the supplied conditions.

The success of this data-driven approach to selecting an optimal set of parameters for beam management depends on the accuracy of the training phase, and the consistency of the training data and testing data. The training and testing data in the above example correspond to the feature set 802 (comprising RSRP measurements, device temperature, device battery level, and demanded throughput) as well as a parameters for beam management that fulfill the objectives of beam management under those conditions.

In order to have accurate training, one possibility is to rely on a training simulator similar to the one discussed above with respect to operation 502. Relying on realistic simulators ensures that an adequate amount of training data can be generated for the success of the data-driven strategy. The training phase for this strategy is based on the operation 502, where sets of optimized parameters for beam management are predetermined corresponding to different scenarios (e.g., for different sets of UE conditions) using simulators. These optimal parameters are supplied for ML model training as training labels, and the set of UE conditions that corresponds to each optimal parameter is supplied for training as a training feature set (which may be converted to a training feature vector by, e.g., a data pre-processing unit).

In other embodiments, the device can train the ML model itself based on measurement data as the measurement data is collected. For example, the device can, at runtime, employ one of the other strategies disclosed herein to select parameters for beam management under various sets of conditions, and can then store the selected sets of parameters as training labels and store the conditions corresponding to the selected parameters as training feature sets. The device can use these training labels and training feature sets (after conversion into training feature vectors) as inputs to the training phase of the ML model. Alternatively, the device can send the stored training labels and training feature sets to another device for offline training of the ML model.

This data-driven strategy can be used to achieve compromise between any number of multiple objectives. The required changes include changing the feature vector to include other objective parameters (for example, in addition or in place of throughput) and by providing appropriate parameter labels.

Although FIG. 8 illustrates one example of a data-driven approach for selecting a set of parameters for beam management, various changes may be made to FIG. 8. For example, various components in FIG. 8 could be combined, further subdivided, or omitted and additional components could be added according to particular needs.

Figure 9:
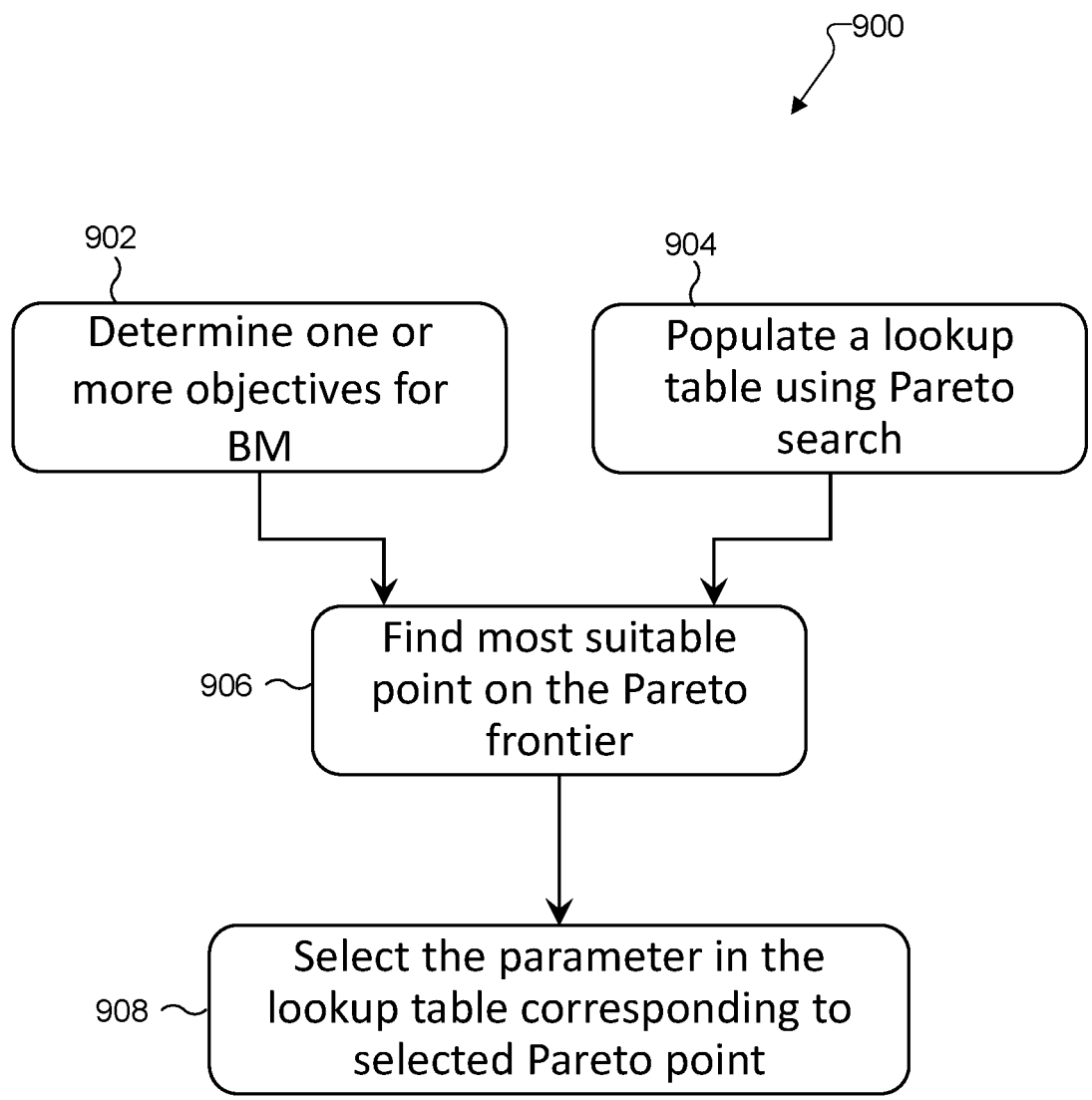
FIG. 9 illustrates a process for selecting a set of parameters for beam management using a lookup table approach according to embodiments of the present disclosure.

FIG. 9 illustrates a process 900 for selecting a set of parameters for beam management using a lookup table approach according to embodiments of the present disclosure. For the purposes of this disclosure, the process of FIG. 9 represents operations of an electronic device 101, which is discussed as a UE. It is understood that the operations could apply to any suitable wireless communication devices in any suitable wireless communication system.

At operation 902, the objectives for beam management are determined (e.g., according to operation 402 above). For simplicity, the example discussed below assumes that two objectives (throughput and module sweeping rate) are selected, but process 900 could be extended to achieve compromise between any two objectives, or between any number of objectives.

At operation 904, a lookup table (LUT) of parameters for beam management is generated. Each entry in the lookup table represents a mapping of a combination of objectives to optimal beam management parameters to achieve the combination of objectives. The lookup table is generated at operation 904 as part of an offline process (e.g., with the help of a simulator, as discussed with respect to operation 502 above). Accordingly, in some embodiments, the lookup table can be generated by a different device and obtained by the UE before runtime. Table 1 below is an example lookup table generated according to operation 904.

TABLE 1

| Throughput (b/s/Hz) | Sweeping rate (sweeps/s) | $RSRP_{th0}$ (dBm) |
| --- | --- | --- |
| 3.05 | 1.2 | −55 |
| 3 | 1 | −60 |
| 2.9 | 0.8 | −65 |
| 2.7 | 0.6 | −70 |
| 2.3 | 0.4 | −75 |
| 1.5 | 0.2 | −80 |

Each entry in Table 1 corresponds to a specific throughput and sweeping rate pair that is optimized over the parameters (in this example the only parameter is $RSRP_{th0}$). Table 1 illustrates that there is a tradeoff between throughput and sweeping rate. As parameters ($RSRP_{th0}$) are selected to increase throughput, sweeping rate is increased as well. Considering this tradeoff, the entries at the top of Table 1 represent a case where achieving high throughput is the primary objective, and the cost of high throughput in terms of increased sweeping rate is tolerable (e.g., in a scenario where the sweeping rate cost for the device is negligible). Similarly, the entries at the bottom of Table 1 represent a case where controlling the sweeping rate becomes the primary objective, and the penalty of keeping the sweeping rate low in terms of reduced throughput is tolerable (e.g., in a scenario where the sweeping rate cost for the device is high).

In this embodiment, the lookup table is populated offline by applying an optimization function to the simulated data (e.g., as generated in operation 502) to find the most suitable parameters to achieve an optimal tradeoff between the determined objectives under various scenarios. Simultaneous optimization for multiple objectives (throughput and sweeping rate in this example) over a set of parameters ($RSRP_{th0}$ in this example) is possible through Pareto optimization. Pareto optimization gives a set of points that form a Pareto frontier, and each point on the frontier represents a tradeoff between the multiple objectives (throughput and sweeping rate). A set of parameters ($RSRP_{th0}$) corresponds to each point on the Pareto frontier and is the best set of parameters to achieve the tradeoff. A Pareto frontier of the tradeoff between throughput and sweeping rate that corresponds to the entries of Table 1 is plotted in FIG. 10.

Figure 10:
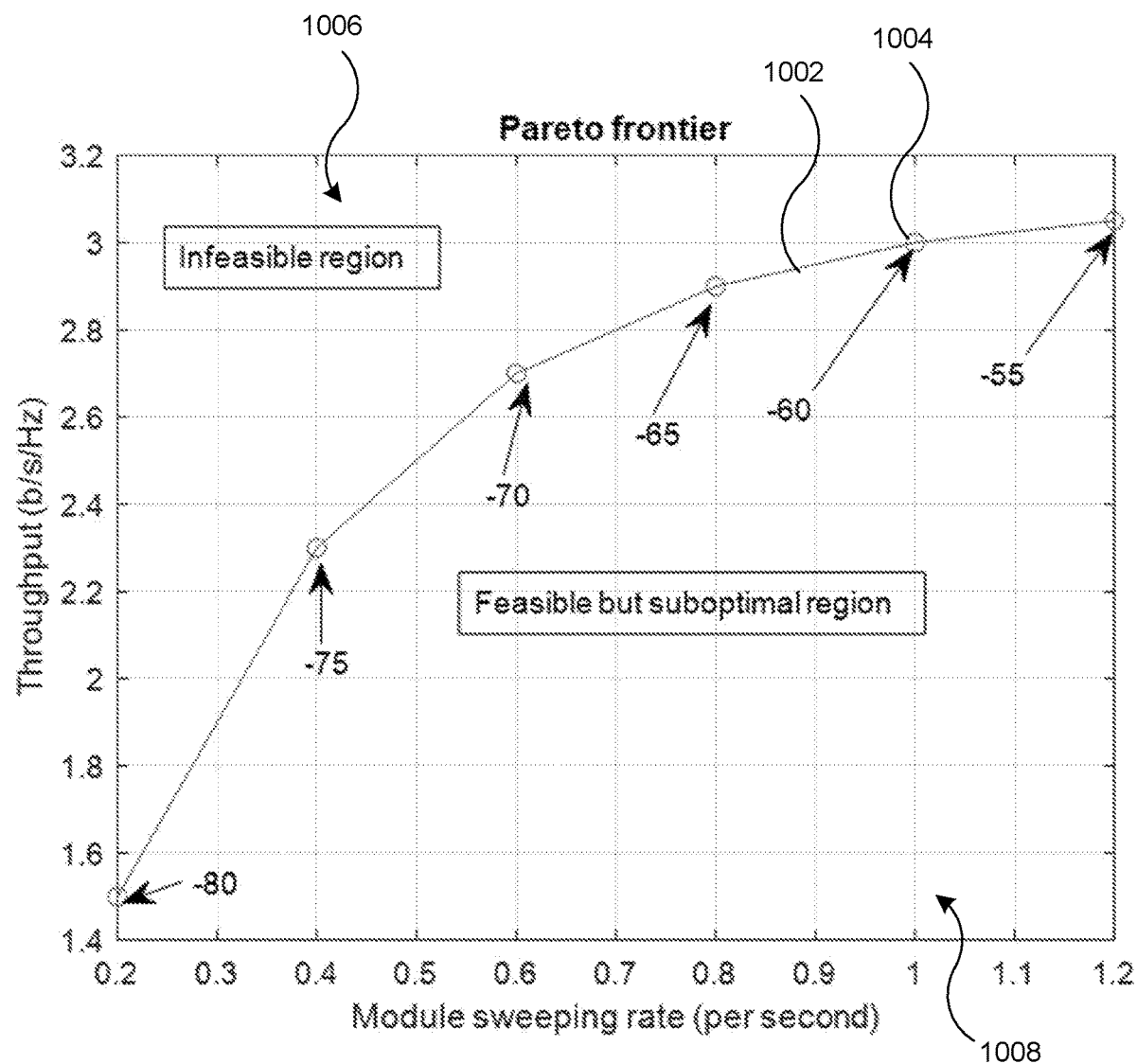
FIG. 10 illustrates a Pareto frontier of a tradeoff between throughput and sweeping rate according to embodiments of the present disclosure.

Referring now to FIG. 10, the Pareto frontier curve 1002 is formed from the set of points 1004 generated by the Pareto optimization of throughput and sweeping rate over $RSRP_{th0}$. The region 1006 above the Pareto frontier curve 1002 is infeasible, meaning that a pair of objectives (sweeping rate, throughput) falling in this region is unachievable in practice. The region 1008 below the Pareto frontier curve 1002 is feasible, but suboptimal compared to the points 1004 on the frontier. Therefore, the objective combinations that generate the points 1004 on the Pareto frontier are the optimal candidates for implementation, and the device should select parameters that correspond to this candidate set to achieve optimal tradeoffs. Accordingly, each entry of the lookup table is populated with the set of objective values and parameters that correspond to the points 1004.

Referring again to FIG. 9, at runtime the most suitable point on the Pareto frontier is determined at operation 906. In this embodiment, a weight is determined that represents the importance of each of the multiple objectives. The multiple objectives are then combined in the form of a weighted sum, expressed as:

$$\max_{\{RSRP_{th0},\ldots\}} w_1 \times \text{Throughput} - (1-w_1) \times \text{Sweeping Rate}, \quad (1)$$

where $1 \geq w_1 \geq 0$. Accordingly, the point on the Pareto frontier with a slope of (or closest to)

$$\frac{1-w_1}{w_1}$$

should be chosen at operation 906 as the most suitable point on the Pareto frontier to optimize the tradeoff of the selected objectives according to the preferences for each objective. Then, at operation 908, the beam management parameters ($RSRP_{th0}$ in this example) corresponding to the chosen point on the pareto frontier should be selected from the lookup table and applied as the optimal parameters for beam management.

In this embodiment, the weight value $w_1$ controls the preference between the throughput and sweeping rate objectives. For values of $w_1$ closer to 1, e.g., 0.99, or 0.999, most of the emphasis is on maximizing throughput, whereas for values of $w_1$ closer to 0, e.g., 0.01 or 0.001, most of the emphasis is on minimizing the sweeping rate, with other tradeoffs achieved by varying the value of $w_1$. Therefore, once the Pareto frontier is given, the optimal (or close-to-optimal) parameters could be inferred from it for an arbitrary cost of the sweeping rate.

As noted above, process 900 could be extended to achieve compromise between any number of objectives. For example, extending the above example selecting an optimal value of only one beam management parameter ($RSRP_{th0}$) to compromise between a number of objectives K>2, there will be K+1 columns in Table 1, with K columns corresponding to the K objectives, and one column corresponding to the parameter $RSRP_{th0}$. Similarly, the function illustrated in the graph of FIG. 10, which is a function of 2 variables (throughput and module sweeping rate), will become a function of K variables.

The weighted sum can be extended to the case with K>2 objectives by defining the weights $\{w_1, w_2, \ldots w_K\}$ for $\Sigma_k w_k = 1$, and defining $s_k \in \pm 1$ as a sign to control whether objective$_k$ needs to be maximized or minimized (1 for maximization, and −1 for minimization). Then the overall objective function becomes:

$$\max_{\{RSRP_{th0},\ldots\}} \sum_{k=1}^{K} w_k \times s_k \times \text{objective}_k \quad (2)$$

In some embodiments of process 900, another aspect of Pareto optimization that can be considered is the granularity of the Pareto frontier, which refers to how many points are determined along the Pareto frontier (and accordingly, how many entries are contained in the lookup table). The naive choice (i.e., to use as many points on the frontier as possible) may not be a good choice for a number of reasons. First, having fewer operational points simplifies the implementation of the above strategy. Second, having a large number of points may not even be beneficial.

One reason for this is that the side information that is used to determine the cost of one optimization objective in comparison with others is itself subject to errors, and it may be possible to quantify the cost into only a small number of levels, defined as $N_{cost}$. As a specific example, in the embodiment of FIG. 6, the module sweeping cost was assumed to be either low or moderate (i.e., $N_{cost}=2$). A larger $N_{cost}$ (e.g., $N_{cost}=5$) can also be considered, representing module sweeping cost levels of low, moderate, considerable, high, and extreme. The number of useful operation scenarios to consider for optimization is limited to the number of possible different costs. Accordingly, if the number of operation points along the Pareto frontier is defined as N, then the Pareto optimization can be performed with $N=N_{cost}$ to cover all useful scenarios.

Another reason that high granularity may provide no benefit is that the mapping of signal quality (e.g., RSRP) to throughput is quantized, so a marginal increase in the RSRP may not necessarily result in a marginal increase in the throughput. For example, a modulation and coding scheme (MCS) is typically applied to a signal before transmission, and the MCS is quantized into discrete levels, each of which requires a certain RSRP to be supported. In a given runtime scenario, in order to increase the throughput by using a higher MCS level, a significant increase in RSRP may be required to support the next MCS level. Increasing RSRP by less than the amount required to support the next MCS level will increase the module sweeping rate without yielding any increased throughput. The number of useful operation scenarios to consider for optimization is therefore limited to the number of possible MCS levels. Accordingly, Pareto optimization can be performed with the number of operation points along the Pareto frontier set to the number of MCS levels $N_{MCS}$ (i.e., $N=N_{MCS}$). Additionally, the insights on constraining granularity based on MCS and cost levels can be combined to determine N as $N=\min(N_{cost}, N_{MCS})$.

The embodiments in this disclosure adapt beam management parameters (e.g., $RSRP_{th0}$) to meet different objectives (high throughput, low module sweeping rate, etc.). These parameters are adapted for different conditions of the device (e.g., whether a device is in a cell center or cell edge, whether a channel is LOS or NLOS, whether the device has high or low battery level, whether the device temperature is high or low, whether the throughput requirement communicated by higher layers is high/medium/low, or the like). As a result, the change of beam management parameters based on different environments or conditions can be detected in controlled environments.

For example, the following experiment can be conducted to determine if a different $RSRP_{th0}$ is used for different device temperature levels. The experiment begins with a low-temperature UE, which can be achieved by, e.g., lack of processing or communication activity at the UE. The experiment is started by transmitting beamformed pilots from a BS to the UE with a high transmit power. With a high enough BS transmit power, the RSRP of the best beam of the UE serving module (i.e., the best receive beam) will not fall below $RSRP_{th0}$, and there will be zero module sweeping at the UE.

Next, the transmit power from the BS is steadily reduced. At this time, the following two things are observed. First, the RSRP of the best beam. This RSRP can be observed from the report that the UE sends to the BS. 5G UEs with FR2 support report at least the RSRP of the best BS beam (and in some cases multiple BS beams). Second, the module sweeping rate of the UE. This observation can be obtained from the UE, for example by dumping logs of the UE. In some cases, entering *#9900# in the dialer screen of a UE will dump the logs. In UEs that include QUALCOMM chipsets, the logging tool QXDM (Qualcomm Extensible Diagnostic Monitor) can be used to dump the logs.

After the transmit power from the BS has fallen below a certain level, the RSRP of the best UE beam will fall below the $RSRP_{th0}$ threshold used by the device, and suddenly there will be significantly high number of module sweeps per second. This level of RSRP is observed (based on the UE report) and recorded. This RSRP level is denoted as RS $\widetilde{RP_{th0\text{-}LT}}$, where the subscript LT signifies low temperature.

Next, the same experiment is repeated, but beginning with a UE at high device temperature. The UE can be heated by rigorous processing or communication activity. Again, the RSRP level that triggers a notably high module sweeping rate is observed and recorded. In this case, the RSRP level is denoted as RS $\widetilde{RP_{th0\text{-}HT}}$, where the subscript HT signifies high temperature.

Finally, RS $\widetilde{RP_{th0\text{-}LT}}$ and RS $\widetilde{RP_{th0\text{-}HT}}$ are compared to each other. A clear difference between RS $\widetilde{RP_{th0\text{-}LT}}$ and RS $\widetilde{RP_{th0\text{-}HT}}$ is an indication that a different beam management parameter $RSRP_{th0}$ is used for low and high device temperature.

Similar experiments based on this concept can be used to determine if a different parameter $RSRP_{th0}$ is used with high and low battery levels, LOS and NLOS channels, and cell center and cell edge devices. For example, to detect whether a different $RSRP_{th0}$ is used for high and low battery levels, the experiment can be performed on a fully charged UE (>95%) and on an almost drained UE (<10%, with the battery saving feature disabled), looking for a difference in the RSRP level below which significant module sweeping is triggered in each case. A clear difference is an indication of different $RSRP_{th0}$ selection depending on battery level.

Similarly, to detect whether a different $RSRP_{th0}$ is used for LOS and NLOS channels, the experiment can be performed on a UE with an LOS channel to the BS, then with an NLOS channel to the BS, noting the difference in the RSRP level below which significant module sweeping is triggered in each case. A clear difference is an indication of different $RSRP_{th0}$ selection depending on LOS or NLOS channel state.

Similarly, to detect whether a different $RSRP_{th0}$ is used for cell center and cell edge UEs, the experiment can be performed on a UE in a cell center, then in a cell edge, noting the difference in RSRP level below which significant module sweeping is triggered in each case. A clear difference is an indication of different $RSRP_{th0}$ selection depending on whether a UE is a cell center or cell edge user.

Another experiment can be conducted to determine if a different $RSRP_{th0}$ is selected for different throughput requirements. The experiment begins with all applications and non-FR2 5G mediums of internet access (e.g., WiFi) turned off at the UE, and an application with a low throughput requirement (e.g., an email application) opened. The experiment is started by transmitting beamformed pilots from a BS to the UE with a high transmit power. As in the above experiment, with a high enough BS transmit power, the RSRP of the best beam of the UE serving module will not fall below $RSRP_{th0}$, and there will be zero module sweeping at the UE.

Next, as in the above experiment, the transmit power from the BS is steadily reduced. At this time, as in the above experiment, the RSRP of the best beam and the module sweeping rate of the UE are observed.

As in the above experiment, after the transmit power from the BS has fallen below a certain level, the RSRP of the best UE beam will fall below the $RSRP_{th0}$ used by the device, and suddenly there will be significantly high number of module sweeps per second. This level of RSRP is observed (based on the UE report) and recorded. This RSRP level is denoted as RS $\widetilde{P_{th0\text{-}LTh}}$, where the subscript LTh signifies low throughput.

Next, the same experiment is repeated, but beginning with an application open that requires a large throughput, e.g., high quality video streaming or gaming. Again, the RSRP level that triggers a notably high module sweeping rate is observed and recorded. In this case, the RSRP level is denoted as RS $\widetilde{P_{th0\text{-}HTh}}$, where subscript HTh signifies high throughput.

Finally, RS $\widetilde{RP_{th0\text{-}LT}}$ and RS $\widetilde{RP_{th0\text{-}HT}}$ are compared to each other. A clear difference in RSR $\widetilde{P_{th0\text{-}LTh}}$ and RSR $\widetilde{P_{th0\text{-}HTh}}$ is an indication that a different beam management parameter $RSRP_{th0}$ is used for low and high throughput requirements.

FIGS. 11-15 illustrate example methods for performing beam management based on multiple beam management objectives in accordance with various embodiments of the present disclosure. For the purposes of this disclosure, the methods are performed by an electronic device 101, which is discussed as a UE. It is understood that the methods could be performed by any suitable wireless communication devices in any suitable wireless communication system.

Figure 11:
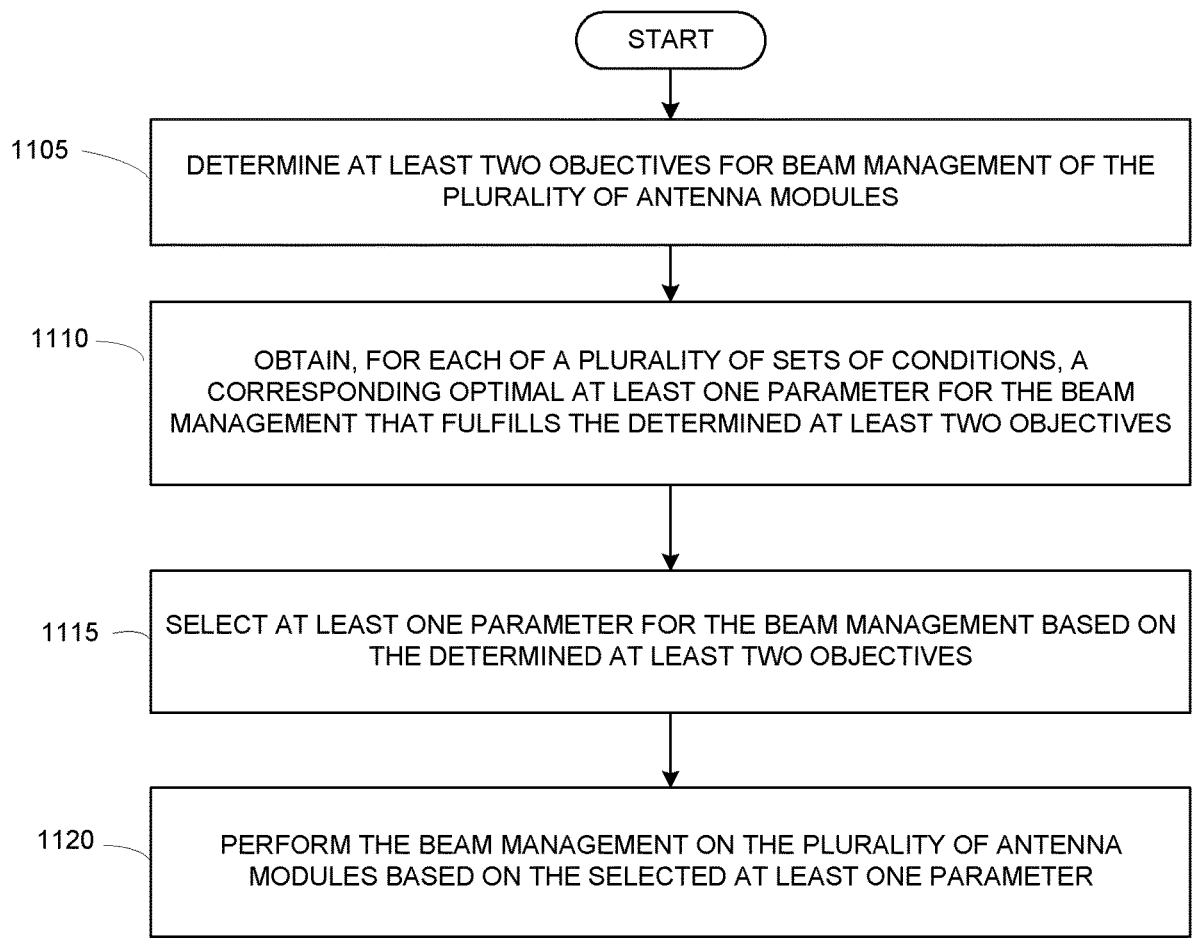
FIGS. 11-15 illustrate example methods for performing beam management based on multiple beam management objectives in accordance with various embodiments of the present disclosure.

Referring now to FIG. 11, the method begins with the device determining at least two objectives for beam management of a plurality of antenna modules (step 1105). In some embodiments, the at least two objectives are determined based on at least one of first information related to a desired data rate, second information related to a cost of searching the plurality of antenna modules for a new beam, or side information of the electronic device. The side information may comprise at least one of a current battery level of the electronic device or a current temperature of the electronic device.

Next, the device obtains, for each of a plurality of sets of conditions, a corresponding optimal at least one parameter for the beam management that fulfills the determined at least two objectives (step 1110). In some embodiments, the corresponding optimal at least one parameter is obtained based on a simulation of the electronic device under each of the plurality of sets of conditions. In other embodiments, the corresponding optimal at least one parameter is obtained based on measurement data collected by the electronic device.

The device then selects at least one parameter for the beam management based on the determined at least two objectives (step 1115). In some embodiments, the device selects, based on a current set of conditions, the optimal at least one parameter that corresponds to the current set of conditions as the at least one parameter for the beam management at step 1115.

Finally, the device performs the beam management on the plurality of antenna modules based on the selected at least one parameter (step 1120).

Figure 12:
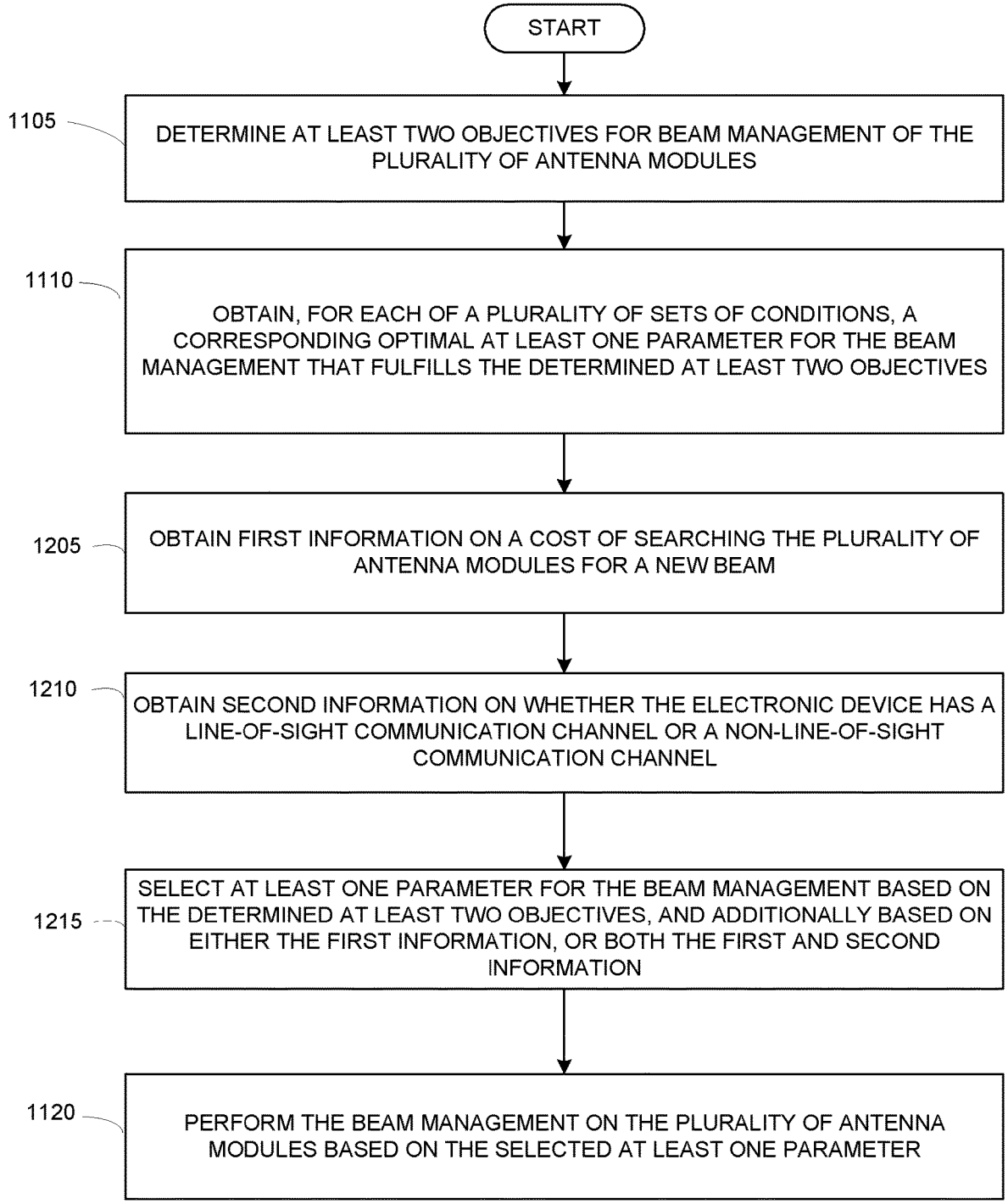

Referring now to FIG. 12, the method begins with steps 1105 and 1110 of FIG. 11. In this embodiment, each of the plurality of sets of conditions includes, as one of the conditions, a signal strength of the electronic device.

Next, the device obtains first information on a cost of searching the plurality of antenna modules for a new beam (step 1205). The cost of searching the plurality of antenna modules for a new beam may refer to the cost of module sweeping discussed herein above.

The device next obtains second information on whether the electronic device has a line-of-sight communication channel or a non-line-of-sight communication channel (step 1210). In some embodiments, step 1210 need not be performed, as will be described further below.

The device then selects at least one parameter for the beam management based on the determined at least two objectives, and additionally based on either the first information, or both the first and second information (step 1215). This step is similar to step 1115 of FIG. 11.

In some embodiments, step 1215 includes the device selecting as the at least one parameter for the beam management, based on the first information indicating that the cost is low, the optimal at least one parameter that corresponds to one of the sets of conditions in which the signal strength of the electronic device is high.

In other embodiments, step 1215 includes selecting as the at least one parameter for the beam management, based on the first information indicating that the cost is moderate and the second information indicating a line-of-sight communication channel, the optimal at least one parameter that corresponds to one of the sets of conditions in which the signal strength of the electronic device is high.

In yet other embodiments, step 1215 includes selecting as the at least one parameter for the beam management, based on the first information indicating that the cost is moderate and the second information indicating a non-line-of-sight communication channel, the optimal at least one parameter that corresponds to one of the sets of conditions in which the signal strength of the electronic device is moderate.

Finally, the device performs step 1120 as described with respect to FIG. 11.

Figure 13:
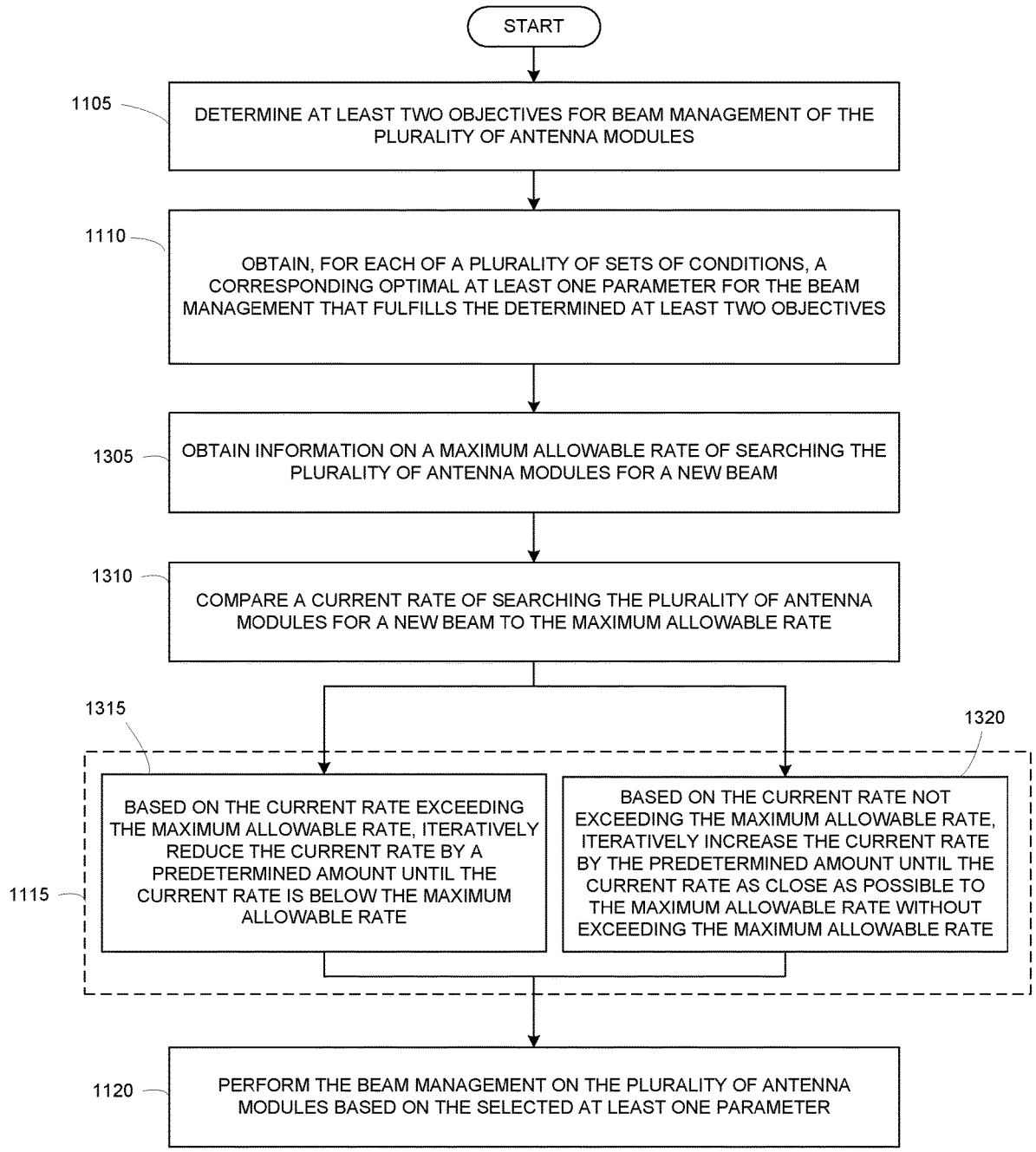

Referring now to FIG. 13, the method begins with steps 1105 and 1110 of FIG. 11. Next, the device obtains information on a maximum allowable rate of searching the plurality of antenna modules for a new beam (step 1305) and compares a current rate of searching the plurality of antenna modules for a new beam to the maximum allowable rate (step 1310). The rate of searching the plurality of antenna modules for a new beam may refer to the module sweeping rate discussed herein above.

Then, based on the current rate exceeding the maximum allowable rate, the device iteratively reduces the current rate by a predetermined amount until the current rate is below the maximum allowable rate (step 1315).

Alternatively, based on the current rate not exceeding the maximum allowable rate, the device iteratively increases the current rate by the predetermined amount until the current rate as close as possible to the maximum allowable rate without exceeding the maximum allowable rate (step 1320).

The process of iteratively increasing or decreasing the current sweeping rate in Steps 1310 and 1315 may, in some embodiments, be implemented by iteratively adjusting one or more parameters for beam management that, in turn, cause the sweeping rate to increase or decrease. For example, iteratively increasing $RSRP_{th0}$ as discussed above will cause the sweeping rate to iteratively increase, and vice versa. Accordingly, steps 1310 and 1315 are similar to step 1115 of FIG. 11.

Finally, the device performs step 1120 as described with respect to FIG. 11.

Figure 14:
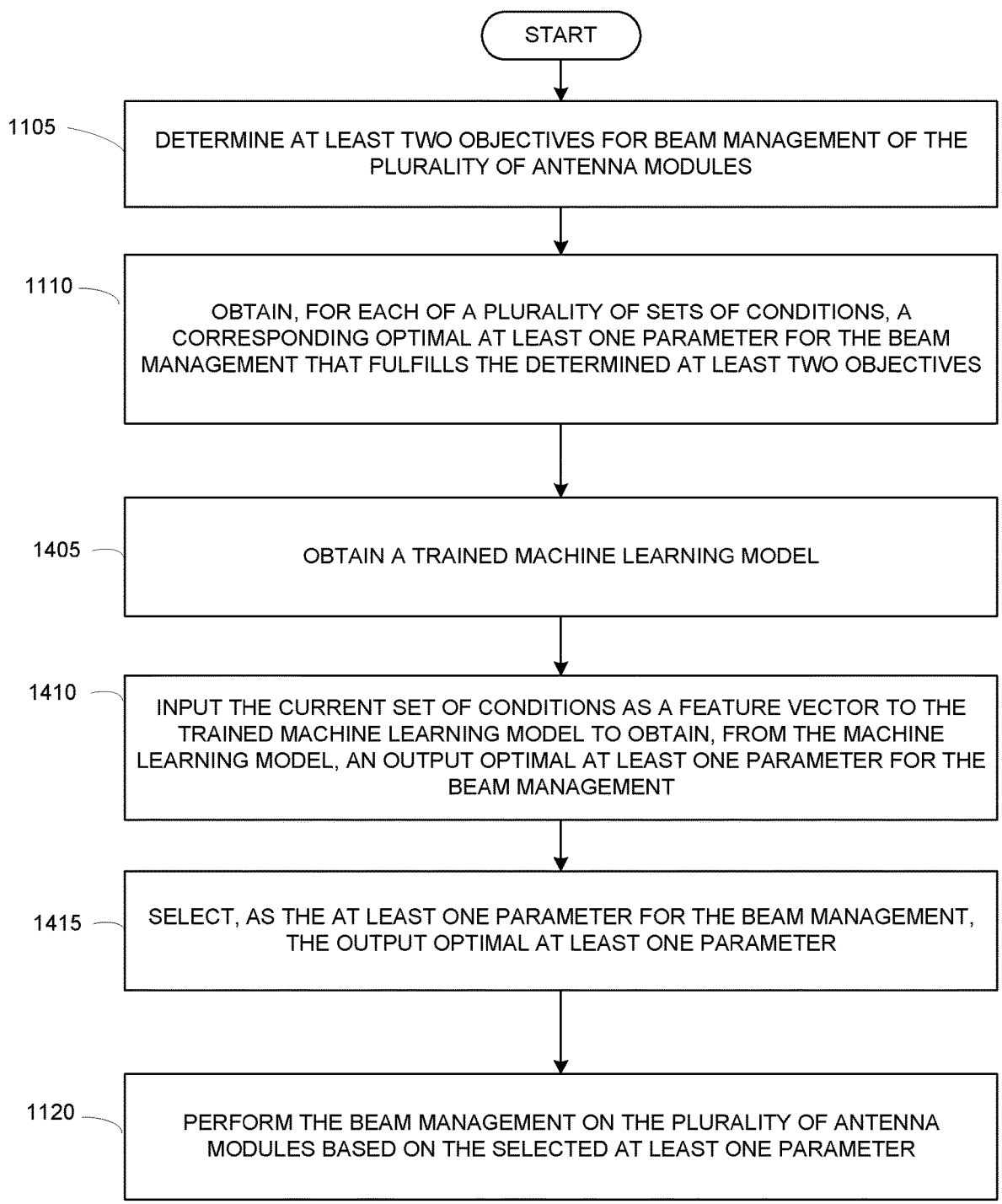

Referring now to FIG. 14, the method begins with steps 1105 and 1110 of FIG. 11. Next, the device obtains a trained machine learning model (step 1405). The machine learning model is trained using the plurality of sets of conditions and the optimal at least one parameter for the beam management that corresponds to each of the plurality of sets of conditions as, respectively, a plurality of training feature vectors and a training label for each corresponding training feature vector.

In some embodiments, the trained machine learning model is obtained from a different device at step 1405. In other embodiments, the device itself trains the machine learning model at step 1405. The machine learning model may be trained based on simulated data, or based on measurement data collected by the device, as discussed above. For example, the machine learning model may be trained based on the information obtained at step 1110. Following from this, in some embodiments wherein the trained machine learning model is obtained from a different device at step 1405, step 1110 may be omitted or step 1405 may replace step 1110, as the information obtained at step 1110 is not needed to train the machine learning model.

Next, the device inputs the current set of conditions as a feature vector to the trained machine learning model to obtain, from the machine learning model, an output optimal at least one parameter for the beam management (step 1410).

The device then selects, as the at least one parameter for the beam management, the output optimal at least one parameter (step 1415). This step can correspond to step 1115 of FIG. 11, as the optimal at least one parameter that is output from the trained machine learning model at step 1410 represents a parameter for the beam management that is based on the determined at least two objectives.

Finally, the device performs step 1120 as described with respect to FIG. 11.

Figure 15:
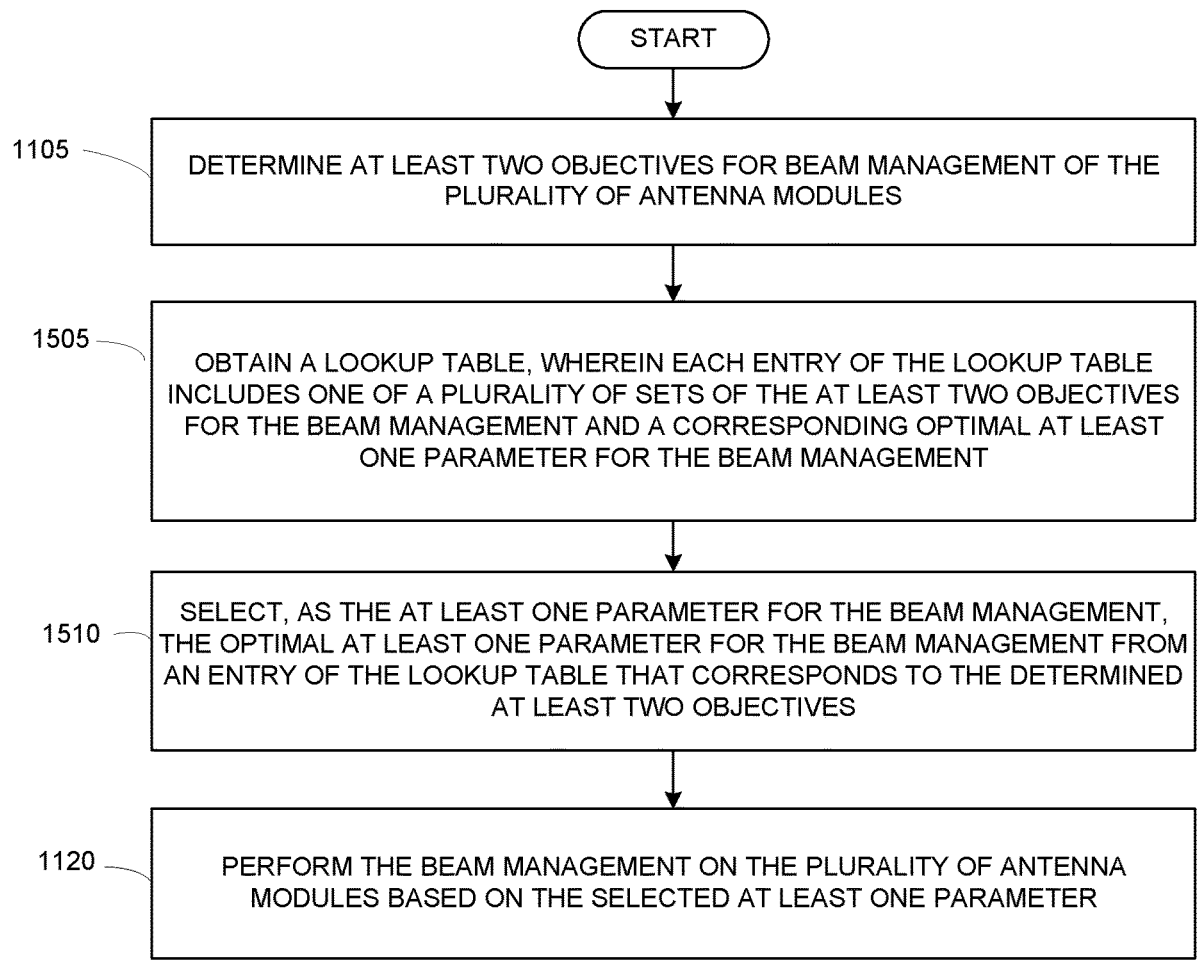

Referring now to FIG. 15, the method begins with step 1105 of FIG. 11. Next, the device obtain a lookup table at step 1505, wherein each entry of the lookup table includes one of a plurality of sets of the at least two objectives for the beam management and a corresponding optimal at least one parameter for the beam management. The optimal at least one parameter for the beam management may be a point on a Pareto frontier that is generated by Pareto optimization of the corresponding set of the at least two objectives, as discussed above.

In some embodiments, the device itself performs the Pareto optimization to generate the lookup table at step 1505. In such embodiments, step 1505 may be preceded by step 1110 of FIG. 11, and the obtained optimal at least one parameter for each of the plurality of sets of conditions is used, along with the plurality of sets of conditions, to perform the Pareto optimization and generate the lookup table.

The device then selects, as the at least one parameter for the beam management, the optimal at least one parameter for the beam management from an entry of the lookup table that corresponds to the determined at least two objectives (step 1510). This step is similar to and may take the place of step 1115 in FIG. 11.

Finally, the device performs step 1120 as described with respect to FIG. 11.

Figure 16:
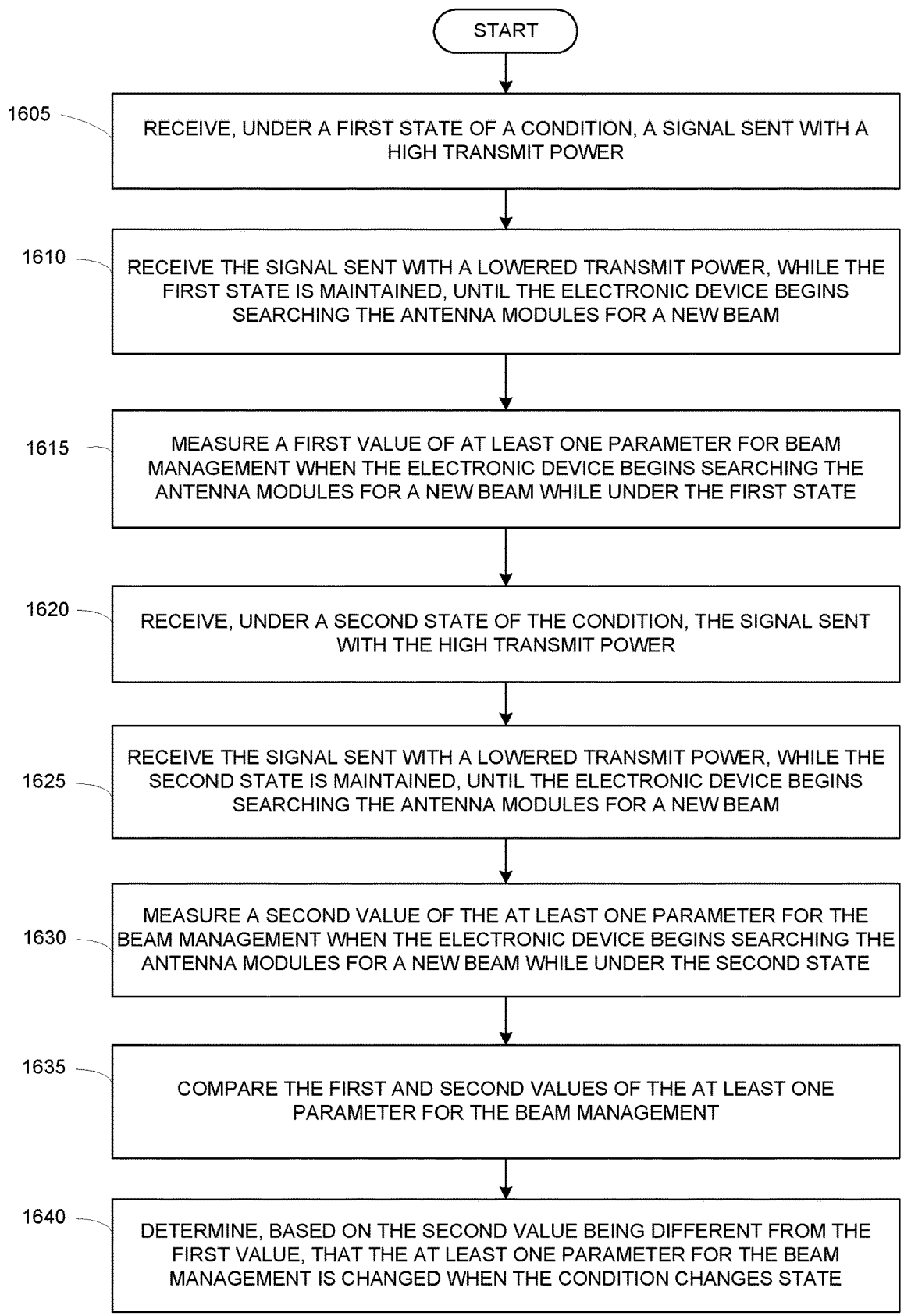
FIG. 16 illustrates an example method for detecting whether a device is performing beam management based on multiple beam management objectives in accordance with various embodiments of the present disclosure.

FIG. 16 illustrates an example method for detecting whether a device is performing beam management based on multiple beam management objectives in accordance with various embodiments of the present disclosure. For the purposes of this disclosure, the method is performed on an electronic device 101, which is discussed as a UE. It is understood that the methods could be performed by any suitable wireless communication devices in any suitable wireless communication system.

Beginning at step 1605, the device receives, under a first state of a condition, a signal sent with a high transmit power. It is assumed that the signal is sent from a base station, or a device acting as a base station, but any suitable transmitting device may be used. The condition the condition is related to at least one of a temperature of the electronic device, a battery level of the electronic device, a line-of-sight status of a communication channel of the signal, a distance of the electronic device from a receiver, or a data rate requirement of the electronic device, as discussed above.

The device then receives the signal sent with a lowered transmit power, while the first state is maintained, until the device begins searching the antenna modules for a new beam (step 1610). For example, the transmit power from the transmitting device is lowered consistently while the rest of the environmental conditions are kept static, causing the device to receive the signal with steadily lower power.

Next, a first value of at least one parameter for beam management is measured when the device begins searching the antenna modules for a new beam while under the first state (step 1615). As discussed above, these measurements may be performed by the device, or observed by a different device, or a combination of the two.

The device then receives, under a second state of the condition, the signal sent with the high transmit power (step 1620). For example, in embodiments wherein the condition is device temperature, the first state of the condition could be low temperature, and the second state of the condition could be high temperature.

Next, the device receives the signal sent with a lowered transmit power, while the second state is maintained, until the device begins searching the antenna modules for a new beam (step 1625). For example, similar to step 1610, the transmit power from the transmitting device is lowered consistently while the rest of the environmental conditions are kept static, causing the device to receive the signal with steadily lower power.

Then, a second value of the at least one parameter for the beam management is measured when the device begins searching the antenna modules for a new beam while under the second state (step 1630). As in step 1615, these measurements may be performed by the device, or observed by a different device, or a combination of the two.

The first and second values of the at least one parameter for the beam management are compared at step 1635. This comparison may be performed by the device, or observed by a different device, or a combination of the two.

Finally, a determination is made, based on the second value being different from the first value, that the at least one parameter for the beam management is changed when the condition changes state (step 1640). This implies that the device is performing beam management based on multiple beam management objectives in accordance with various embodiments of the present disclosure. This determination may be made by the device, or by a different device.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device comprising:
  a plurality of antenna modules; and
  a processor configured to:
    determine at least two objectives for beam management of the plurality of antenna modules;
    select at least one parameter for the beam management based on the determined at least two objectives; and
    perform the beam management on the plurality of antenna modules based on the selected at least one parameter.

2. The electronic device of claim 1, wherein the processor is configured to:
  determine the at least two objectives for beam management based on at least one of first information related to a desired data rate, second information related to a cost of searching the plurality of antenna modules for a new beam, or side information of the electronic device,
  wherein the side information comprises at least one of a current battery level of the electronic device or a current temperature of the electronic device.

3. The electronic device of claim 1, wherein the processor is further configured to:
  obtain, for each of a plurality of sets of conditions, a corresponding optimal at least one parameter for the beam management that fulfills the determined at least two objectives, based on a simulation of the electronic device under each of the plurality of sets of conditions, or based on measurement data collected by the electronic device; and
  select, based on a current set of conditions, the optimal at least one parameter that corresponds to the current set of conditions as the at least one parameter for the beam management.

4. The electronic device of claim 3, wherein:
  each of the plurality of sets of conditions includes, as one of the conditions, a signal strength of the electronic device, and the processor is further configured to:

obtain first information on a cost of searching the plurality of antenna modules for a new beam;

select as the at least one parameter for the beam management, based on the first information indicating that the cost is low, the optimal at least one parameter that corresponds to one of the sets of conditions in which the signal strength of the electronic device is high;

obtain second information on whether the electronic device has a line-of-sight communication channel or a non-line-of-sight communication channel;

select as the at least one parameter for the beam management, based on the first information indicating that the cost is moderate and the second information indicating a line-of-sight communication channel, the optimal at least one parameter that corresponds to one of the sets of conditions in which the signal strength of the electronic device is high; and select as the at least one parameter for the beam management, based on the first information indicating that the cost is moderate and the second information indicating a non-line-of-sight communication channel, the optimal at least one parameter that corresponds to one of the sets of conditions in which the signal strength of the electronic device is moderate.

5. The electronic device of claim 3, wherein the processor is further configured to:

obtain information on a maximum allowable rate of searching the plurality of antenna modules for a new beam;

compare a current rate of searching the plurality of antenna modules for a new beam to the maximum allowable rate;

based on the current rate exceeding the maximum allowable rate, iteratively reduce the current rate by a predetermined amount until the current rate is below the maximum allowable rate; and based on the current rate not exceeding the maximum allowable rate, iteratively increase the current rate by the predetermined amount until the current rate is as close as possible to the maximum allowable rate without exceeding the maximum allowable rate.

6. The electronic device of claim 3, wherein the processor is further configured to:

obtain a trained machine learning model, wherein the machine learning model is trained using the plurality of sets of conditions and the optimal at least one parameter for the beam management that corresponds to each of the plurality of sets of conditions as, respectively, a plurality of training feature vectors and a training label for each corresponding training feature vector;

input the current set of conditions as a feature vector to the trained machine learning model to obtain, from the machine learning model, an output optimal at least one parameter for the beam management; and select, as the at least one parameter for the beam management, the output optimal at least one parameter.

7. The electronic device of claim 1, wherein the processor is further configured to:

obtain a lookup table, wherein each entry of the lookup table includes one of a plurality of sets of the at least two objectives for the beam management and a corresponding optimal at least one parameter for the beam management, wherein the optimal at least one parameter for the beam management is a point on a Pareto frontier that is generated by Pareto optimization of the corresponding set of the at least two objectives; and select, as the at least one parameter for the beam management, the optimal at least one parameter for the beam management from an entry of the lookup table that corresponds to the determined at least two objectives.

8. A method of beam management in an electronic device, the method comprising:

determining at least two objectives for beam management of a plurality of antenna modules;

selecting at least one parameter for the beam management based on the determined at least two objectives; and performing the beam management on the plurality of antenna modules based on the selected at least one parameter.

9. The method of claim 8, further comprising:

determining the at least two objectives for beam management based on at least one of first information related to a desired data rate, second information related to a cost of searching the plurality of antenna modules for a new beam, or side information of the electronic device, wherein the side information comprises at least one of a current battery level of the electronic device or a current temperature of the electronic device.

10. The method of claim 8, further comprising:

obtaining, for each of a plurality of sets of conditions, a corresponding optimal at least one parameter for the beam management that fulfills the determined at least two objectives, based on a simulation of the electronic device under each of the plurality of sets of conditions, or based on measurement data collected by the electronic device; and selecting, based on a current set of conditions, the optimal at least one parameter that corresponds to the current set of conditions as the at least one parameter for the beam management.

11. The method of claim 10, wherein:

each of the plurality of sets of conditions includes, as one of the conditions, a signal strength of the electronic device, and the method further comprises:

obtaining first information on a cost of searching the plurality of antenna modules for a new beam;

selecting as the at least one parameter for the beam management, based on the first information indicating that the cost is low, the optimal at least one parameter that corresponds to one of the sets of conditions in which the signal strength of the electronic device is high;

obtaining second information on whether the electronic device has a line-of-sight communication channel or a non-line-of-sight communication channel;

selecting as the at least one parameter for the beam management, based on the first information indicating that the cost is moderate and the second information indicating a line-of-sight communication channel, the optimal at least one parameter that corresponds to one of the sets of conditions in which the signal strength of the electronic device is high; and selecting as the at least one parameter for the beam management, based on the first information indicating that the cost is moderate and the second information indicating a non-line-of-sight communication channel, the optimal at least one parameter that corresponds to one of the sets of conditions in which the signal strength of the electronic device is moderate.

12. The method of claim 10, further comprising:
obtaining information on a maximum allowable rate of searching the plurality of antenna modules for a new beam;
comparing a current rate of searching the plurality of antenna modules for a new beam to the maximum allowable rate;
based on the current rate exceeding the maximum allowable rate, iteratively reducing the current rate by a predetermined amount until the current rate is below the maximum allowable rate; and
based on the current rate not exceeding the maximum allowable rate, iteratively increasing the current rate by the predetermined amount until the current rate is as close as possible to the maximum allowable rate without exceeding the maximum allowable rate.

13. The method of claim 10, further comprising:
obtaining a trained machine learning model, wherein the machine learning model is trained using the plurality of sets of conditions and the optimal at least one parameter for the beam management that corresponds to each of the plurality of sets of conditions as, respectively, a plurality of training feature vectors and a training label for each corresponding training feature vector;
inputting the current set of conditions as a feature vector to the trained machine learning model to obtain, from the machine learning model, an output optimal at least one parameter for the beam management; and
selecting, as the at least one parameter for the beam management, the output optimal at least one parameter.

14. The method of claim 8, further comprising:
obtaining a lookup table, wherein each entry of the lookup table includes one of a plurality of sets of the at least two objectives for the beam management and a corresponding optimal at least one parameter for the beam management, wherein the optimal at least one parameter for the beam management is a point on a Pareto frontier that is generated by Pareto optimization of the corresponding set of the at least two objectives; and
selecting, as the at least one parameter for the beam management, the optimal at least one parameter for the beam management from an entry of the lookup table that corresponds to the determined at least two objectives.

15. A non-transitory computer-readable medium configured to store instructions that, when executed by a processor of an electronic device comprising a plurality of antenna modules, cause the electronic device to:
determine at least two objectives for beam management of the plurality of antenna modules based on at least one of first information related to a desired data rate, second information related to a cost of searching the plurality of antenna modules for a new beam, or side information of the electronic device, wherein the side information comprises at least one of a current battery level of the electronic device or a current temperature of the electronic device;
select at least one parameter for the beam management based on the determined at least two objectives; and
perform the beam management on the plurality of antenna modules based on the selected at least one parameter.

16. The non-transitory computer-readable medium of claim 15, wherein the instructions, when executed by the processor, further cause the electronic device to:
obtain, for each of a plurality of sets of conditions, a corresponding optimal at least one parameter for the beam management that fulfills the determined at least two objectives, based on a simulation of the electronic device under each of the plurality of sets of conditions, or based on measurement data collected by the electronic device; and
select, based on a current set of conditions, the optimal at least one parameter that corresponds to the current set of conditions as the at least one parameter for the beam management.

17. The non-transitory computer-readable medium of claim 16, wherein:
each of the plurality of sets of conditions includes, as one of the conditions, a signal strength of the electronic device, and
the instructions, when executed by the processor, further cause the electronic device to:
obtain first information on a cost of searching the plurality of antenna modules for a new beam;
select as the at least one parameter for the beam management, based on the first information indicating that the cost is low, the optimal at least one parameter that corresponds to one of the sets of conditions in which the signal strength of the electronic device is high;
obtain second information on whether the electronic device has a line-of-sight communication channel or a non-line-of-sight communication channel;
select as the at least one parameter for the beam management, based on the first information indicating that the cost is moderate and the second information indicating a line-of-sight communication channel, the optimal at least one parameter that corresponds to one of the sets of conditions in which the signal strength of the electronic device is high; and
select as the at least one parameter for the beam management, based on the first information indicating that the cost is moderate and the second information indicating a non-line-of-sight communication channel, the optimal at least one parameter that corresponds to one of the sets of conditions in which the signal strength of the electronic device is moderate.

18. The non-transitory computer-readable medium of claim 16, wherein the instructions, when executed by the processor, further cause the electronic device to:
obtain information on a maximum allowable rate of searching the plurality of antenna modules for a new beam;
compare a current rate of searching the plurality of antenna modules for a new beam to the maximum allowable rate;
based on the current rate exceeding the maximum allowable rate, iteratively reduce the current rate by a predetermined amount until the current rate is below the maximum allowable rate; and
based on the current rate not exceeding the maximum allowable rate, iteratively increase the current rate by the predetermined amount until the current rate is as close as possible to the maximum allowable rate without exceeding the maximum allowable rate.

19. The non-transitory computer-readable medium of claim 16, wherein the instructions, when executed by the processor, further cause the electronic device to:

obtain a trained machine learning model, wherein the machine learning model is trained using the plurality of sets of conditions and the optimal at least one parameter for the beam management that corresponds to each of the plurality of sets of conditions as, respectively, a plurality of training feature vectors and a training label for each corresponding training feature vector;

input the current set of conditions as a feature vector to the trained machine learning model to obtain, from the machine learning model, an output optimal at least one parameter for the beam management; and select, as the at least one parameter for the beam management, the output optimal at least one parameter.

20. The non-transitory computer-readable medium of claim 15, wherein the instructions, when executed by the processor, further cause the electronic device to:

obtain a lookup table, wherein each entry of the lookup table includes one of a plurality of sets of the at least two objectives for the beam management and a corresponding optimal at least one parameter for the beam management, wherein the optimal at least one parameter for the beam management is a point on a Pareto frontier that is generated by Pareto optimization of the corresponding set of the at least two objectives; and select, as the at least one parameter for the beam management, the optimal at least one parameter for the beam management from an entry of the lookup table that corresponds to the determined at least two objectives.

* * * * *